United States Patent
Ott

(10) Patent No.: US 11,480,751 B2
(45) Date of Patent: Oct. 25, 2022

(54) OPTICAL FIBER CABLE FANOUT ARRANGEMENTS, COMPONENTS, AND METHODS

(71) Applicant: COMMSCOPE TECHNOLOGIES LLC, Hickory, NC (US)

(72) Inventor: Michael James Ott, Hudson, WI (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 16/635,768

(22) PCT Filed: Jul. 30, 2018

(86) PCT No.: PCT/US2018/044340
§ 371 (c)(1),
(2) Date: Jan. 31, 2020

(87) PCT Pub. No.: WO2019/027883
PCT Pub. Date: Feb. 7, 2019

(65) Prior Publication Data
US 2021/0132317 A1    May 6, 2021

Related U.S. Application Data

(60) Provisional application No. 62/539,107, filed on Jul. 31, 2017.

(51) Int. Cl.
*G02B 6/44* (2006.01)
(52) U.S. Cl.
CPC .................. *G02B 6/4472* (2013.01)
(58) Field of Classification Search
CPC ................. G02B 6/4472; G02B 6/44

USPC ........................................... 385/134
See application file for complete search history.

(56) References Cited

U.S. PATENT DOCUMENTS

| | | | | |
|---|---|---|---|---|
| 4,119,362 A * | 10/1978 | Holzman | .......... | G02B 6/32 385/73 |
| 5,567,174 A * | 10/1996 | Ericson, Jr. | ........ | H01R 13/5205 439/462 |
| 5,960,141 A * | 9/1999 | Sasaki | .......... | G02B 6/421 385/88 |
| 6,422,765 B1 * | 7/2002 | Goldner | .......... | G02B 6/4202 250/239 |
| 6,488,414 B1 * | 12/2002 | Dawes | .......... | G02B 6/4203 385/79 |
| 7,121,732 B2 * | 10/2006 | Pimpinella | .......... | G02B 6/4471 385/53 |

(Continued)

OTHER PUBLICATIONS

International Search Report and Written Opinion of the International Searching Authority for International Patent Application No. PCT/US2018/044340 dated Nov. 16, 2018, 16 pages.

*Primary Examiner* — Kaveh C Kianni
(74) *Attorney, Agent, or Firm* — Merchant & Gould P.C.

(57) ABSTRACT

A fiber fanout assembly is provided with one or more endcaps, an epoxy fill hole, and air vent holes. A mold can be used with endcaps to create an epoxy body without an external housing structure. External housing structures can also be provided with one or more endcaps. Air vent holes can be provided in the endcaps. An epoxy fill hole can be provided in an endcap. An epoxy fill hole can also be provided adjacent to a fiber breakout end of the fiber fanout housing.

16 Claims, 25 Drawing Sheets

(56) References Cited

U.S. PATENT DOCUMENTS

| | | | | |
|---|---|---|---|---|
| 7,207,725 B1* | 4/2007 | Antonelli | G02B 6/2804 | 385/53 |
| 7,260,299 B1* | 8/2007 | Di Teodoro | G02B 6/02347 | 385/123 |
| 8,272,791 B2* | 9/2012 | Chen | G02B 6/36 | 385/79 |
| 8,559,785 B2* | 10/2013 | Barlowe | G02B 6/4471 | 385/135 |
| 8,573,855 B2 | 11/2013 | Nhep | | |
| 8,705,930 B2* | 4/2014 | Lu | G02B 6/3878 | 385/137 |
| 8,737,786 B1* | 5/2014 | Compton | G02B 6/4472 | 385/100 |
| 8,842,961 B2 | 9/2014 | Thackston et al. | | |
| 9,069,118 B2* | 6/2015 | Matsuo | G02B 6/02042 | |
| 9,151,904 B2* | 10/2015 | Nhep | G02B 6/3887 | |
| 10,092,356 B2* | 10/2018 | Griffin | A61B 18/22 | |
| 10,459,160 B2* | 10/2019 | Brusberg | H05K 1/0274 | |
| 10,564,363 B1* | 2/2020 | Corl | G02B 6/3803 | |
| 2003/0133688 A1* | 7/2003 | Wing Leung | G02B 6/3885 | 385/137 |
| 2004/0052481 A1* | 3/2004 | Seguin | G02B 6/4248 | 385/94 |
| 2010/0086260 A1* | 4/2010 | Parikh | G02B 6/4442 | 385/76 |
| 2010/0092136 A1* | 4/2010 | Nhep | G02B 6/4472 | 385/76 |
| 2010/0261961 A1* | 10/2010 | Scott | A61B 1/00096 | 600/111 |
| 2012/0262781 A1* | 10/2012 | Price | G02B 6/14 | 359/341.3 |
| 2013/0011102 A1* | 1/2013 | Rinzler | G02B 6/3813 | 385/89 |
| 2014/0153876 A1* | 6/2014 | Dendas | H02G 15/007 | 385/76 |
| 2014/0254989 A1* | 9/2014 | Takahashi | G02B 6/3861 | 385/80 |
| 2014/0275765 A1* | 9/2014 | Gebhart | G01J 3/453 | 600/103 |
| 2017/0102506 A1* | 4/2017 | Newbury | G02B 6/4472 | |
| 2018/0045894 A1* | 2/2018 | Takahashi | G02B 6/387 | |
| 2019/0372449 A1* | 12/2019 | Mills | H02K 44/085 | |
| 2020/0049920 A1* | 2/2020 | Takeuchi | G02B 6/4472 | |
| 2020/0116952 A1* | 4/2020 | Rosson | G02B 6/387 | |

\* cited by examiner

OPTICAL FIBER CABLE FANOUT ARRANGEMENTS, COMPONENTS, AND METHODS

CROSS-REFERENCE TO RELATED APPLICATION

This application is a National Stage Patent Application of PCT/US2018/044340, filed on Jul. 30, 2018, which claims the benefit of U.S. Patent Application Ser. No. 62/539,107, filed on Jul. 31, 2017, the disclosures of which are incorporated herein by reference in their entireties. To the extent appropriate, a claim of priority is made to each of the above disclosed applications.

FIELD OF THE INVENTION

This disclosure relates to fanout arrangements for fiber optic cables, components thereof, and methods of use and assembly.

BACKGROUND

The internal construction of fiber optic cables often comprises a plurality of optical fibers. A technician connects a cable fanout arrangement to/on a fiber optic cable to manage the various optical fibers. The fanout arrangement organizes the fibers to facilitate management and maintenance, for example, at a junction point or break-out area.

Previous approaches have been developed to address optical fiber cable fanouts. Examples are described in such references as U.S. Pat. Nos. 8,705,930 and 8,573,855, each of which is incorporated herein by reference in its entirety. Improvements are desired and provided herein.

SUMMARY

To manage transport and connection of optical fibers at a subsequent juncture point, optical fibers in a cable should be organized. Organizing optical fibers can include fanning out the fibers from a sheathed protection layer of the cable with a cable fanout assembly. Once the fibers are fanned out, the fibers are preferably channeled into a selected arrangement, including breakout or fanout or furcation cables. The present disclosure is directed to systems, apparatuses, and methods for organization and management of the optical fibers in a cable fanout arrangement.

One aspect of the disclosure relates to a cable fanout arrangement comprising a cable fanout assembly including two endcaps spaced apart from one another, and a molded body molded over optical fibers extending between the two endcaps. The molded body can also be molded over the end of the cables, tubes, or conduits entering and exiting the fanout assembly.

In one embodiment, an epoxy creates the fanout body. Other moldable and/or curable materials can be used.

The endcaps can be made in different shapes and/or sizes for different cables, tubes, or conduits, or for different numbers of fanouts or breakouts.

In one aspect of the disclosure, a mold is used to mold the epoxy in a desired shape with the two endcaps located in a spaced-apart position. Before the mold is closed, the fibers, the input cable, and any fanout or furcation cables for the broken-out fibers can be adjusted as needed. Furthermore, the cable to be broken out can also be adjusted with respect to strength members and/or fiber positioning before the epoxy is added to the mold.

In another aspect of the disclosure, a funnel-shaped body part can be provided along with two endcaps which together form an enclosed chamber which can be filled with a moldable and/or curable material, such as epoxy. A fixture such as a mold half or a full mold can be used for holding the parts in the proper position prior to application of the moldable and/or curable material.

In a still further aspect of the disclosure, a funnel-shaped body part and one or two endcaps can be utilized that are attached to one another without the use of a fixture, mold, or an external device prior to application of the moldable and/or curable material.

In a still further aspect of the disclosure, a moldable and/or curable material fill hole is provided through one of the endcaps. In one embodiment, a larger endcap associated with the broken-out fibers and furcation cables contains the fill hole. The fill hole can also form a side port positioned closer to the outlet end of the fanout assembly.

A still further aspect of the disclosure includes the use of small air vent holes generally around one or both the ends of the fanout main body part and/or in the endcaps. In one example, the vent holes can be sized in the range of 0.1 millimeters (mm) to 0.5 mm in diameter, and more preferably about 0.1 mm to 0.3 mm in diameter. According to one example, the vent holes are less than 0.5 mm in diameter. According to another embodiment, the vent holes are less than 0.3 mm in diameter. According to one embodiment, a minimum length for the vent holes, corresponding to the minimal wall thickness of the parts defining the holes, may be about 1 mm. In shape, the vent holes may be provided as cylindrical. A preferred shape may be cylindrical with a chamfer that opens up the outer dimension on the exterior of the part defining the vent holes (away from the interior cavity defined by the fanout body). According to another embodiment, the shape of the vent holes may be conical with the smallest diameter nearest the interior cavity defined by the fanout body.

In a still further aspect of the disclosure, a fill hole close to the outlet end of the fanout main body, rather than being centrally located, or located only toward the inlet end can assist with flow of the moldable and/or curable material around the fibers and the furcation cables.

A further aspect of the disclosure is to utilize a translucent fanout body part so as to better observe the fibers, cables, tubes, conduits, and the moldable and/or curable material flow.

A still further aspect of the disclosure includes providing a tortuous or serpentine-type pathway between adjacent parts, wherein the curable material has a more difficult time to find an exit pathway from an interior of the fanout body part, before hardening curing.

A further aspect of the disclosure concerns a cable seat at one or both ends of the fanout main body part, wherein a portion of the cable jacket is received within an interior of the fanout main body part, wherein a small pocket surrounds an outer jacket of the cable, and wherein one or more windows are provided to allow for curable material to flow to contact the outer jacket of the cable.

DETAILED DESCRIPTION

Figure 1A:
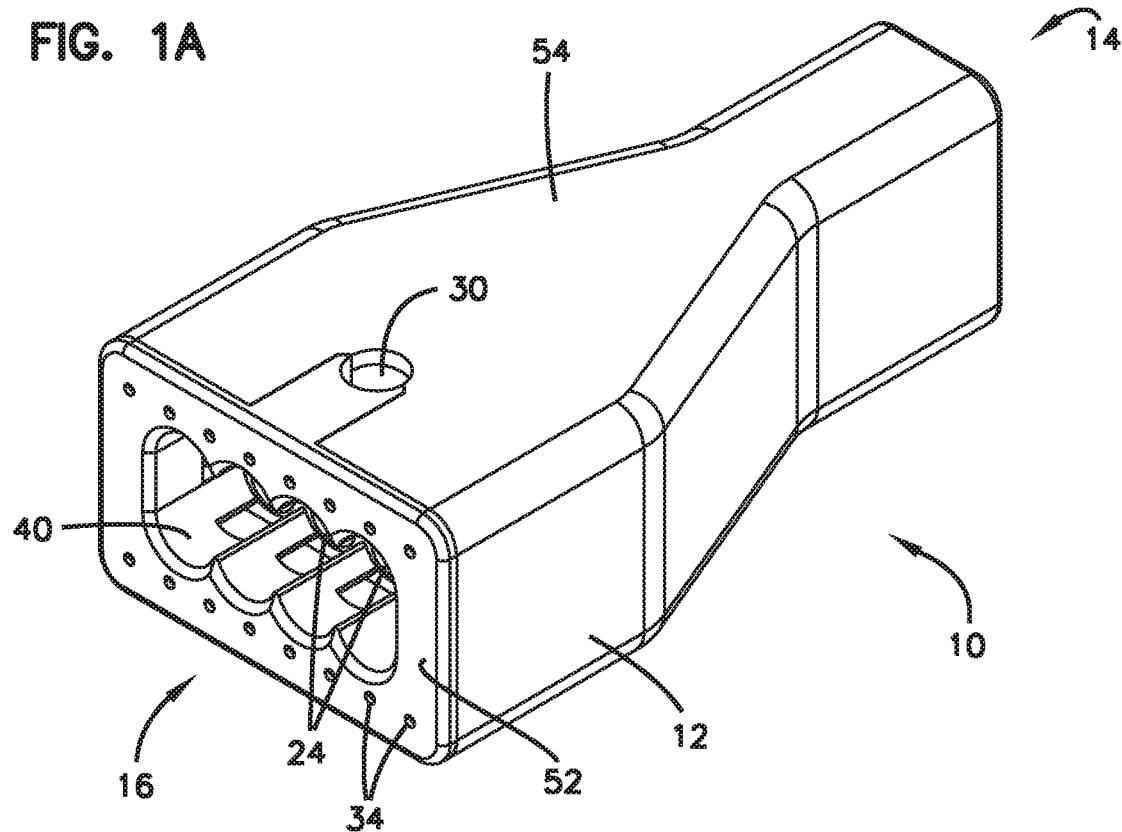
FIG. 1A is a first perspective view of one example embodiment of a fiber fanout assembly, wherein an interior is sized for fibers and a moldable and/or curable material.

A fiber optic cable typically includes a plurality of optical fibers. In some instances, fibers of the cable need to be accessed and/or managed. An optical fiber fanout assembly is used to manage the fibers by fanning out the fibers. The term "fanning out" as used herein, in this context, refers to a process of organizing the fibers, typically by aligning them as the fibers pass from one or more cables to one or more additional cables, tubes, conduits, or other devices.

FIGS. 1A, 1B, 13, 35, 36, 37, and 38 show various examples of an optical fiber fanout assembly. The various embodiments include some common features, and some unique features different from the other embodiments described herein.

The fiber fanout assembly can also be considered a transition assembly for a fiber breakout. As noted, fibers are fanned out or broken out in a desired manner within the breakout or fanout assembly (or transition assembly) so that the optical fibers extend from one cable, tube, conduit, or other device to one or more other cables, tubes, conduits, or other devices. In one example, the optical fibers are fanned out from a single 24-fiber cable to 24 single fiber breakout cables. In another example, a single fiber optic cable with a plurality of optical fibers contained therein is broken out or fanned out into four fiber breakout cables.

The fiber fanouts of the present disclosure may also provide a transition from like fiber count to like fiber count. For example, a fanout may be used as a transition from a very stiff cable to a very flexible breakout tube to facilitate further connectivity. Jacket count going in can equal jacket count coming out.

A common fanout or breakout transitions from a main cable or cables to groups of smaller bundles or single fibers. These fanout assemblies link the main cable or cables to the smaller bundles or single fibers. An advantage of the optical fiber fanout assemblies is to prevent unintended bending or breaking of the optical fibers.

In this description, the terms cables, tubes, and conduits are generally interchangeable, and not meant to suggest differences in structure or function unless otherwise noted. Similarly, in this description, the terms fanout, furcation, or breakout with cables, tubes, or conduits are generally interchangeable, and not meant to suggest differences in structure or function unless otherwise noted.

In the case of a traditional fanout or breakout, a first cable enters the fanout body at an "inlet end." An outer jacket is removed exposing the inner elements of the cable, including the optical fibers (singles, or ribbons), and most likely a strength member in the form of a rod or rods, or yarns. The optical fibers pass through the fanout to an "outlet end." The fibers are then fed through the fanout, furcation, or breakout cables. Proximal ends of each fanout, furcation, or breakout cable are connected to the fanout body. Distal ends may be terminated with connectors or spliced to other optical fibers.

In this manner, the first cable (usually larger in diameter) is broken out in a protected manner to the fibers, which are then protected in the fanout cables (usually smaller in diameter). In this case, protection can be in the form of bend protection and/or pull protection. In this description, "inlet end" and "outlet end" are used to differentiate the ends of the fanout. First and second ends can also be used to differentiate the two ends. A similar description is also possible for the cables entering and exiting the fanout.

Figure 1B:
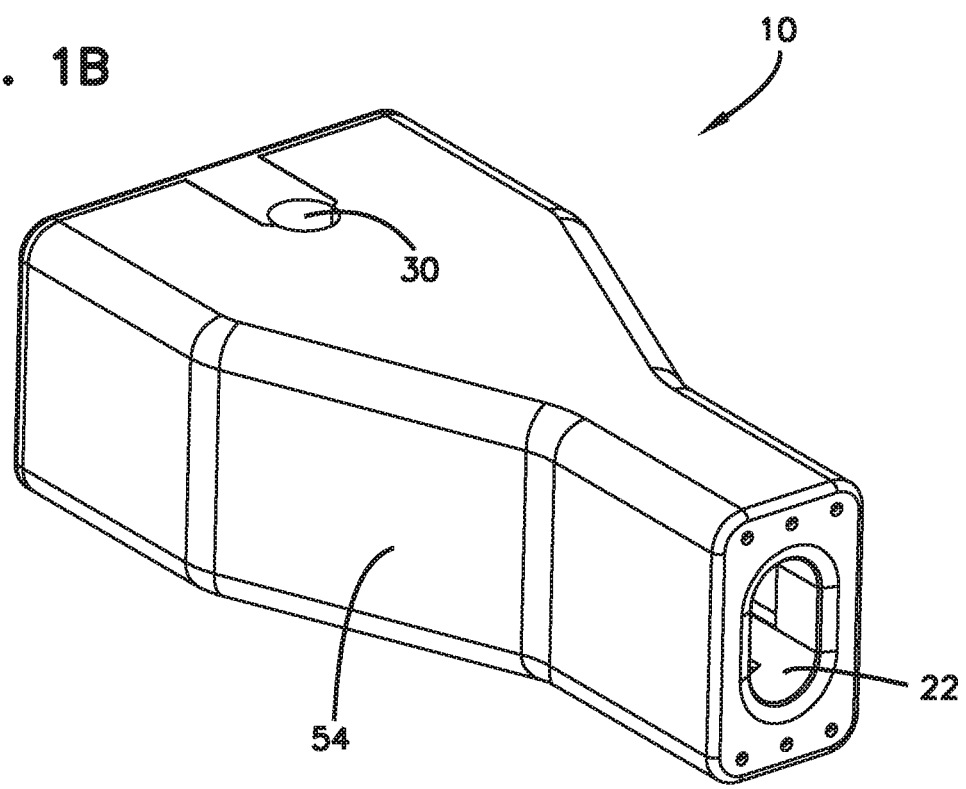
FIG. 1B is another perspective view of the fiber fanout assembly of FIG. 1A.
Figure 2:
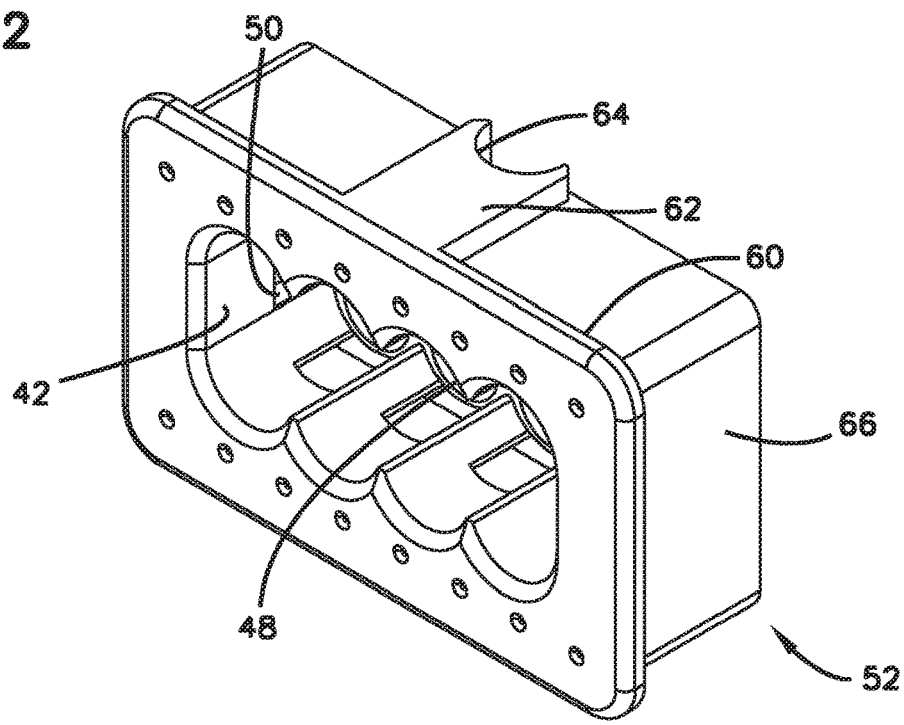
FIG. 2 is a perspective view of the endcap of the fanout assembly of FIGS. 1A-1B.
Figure 3:
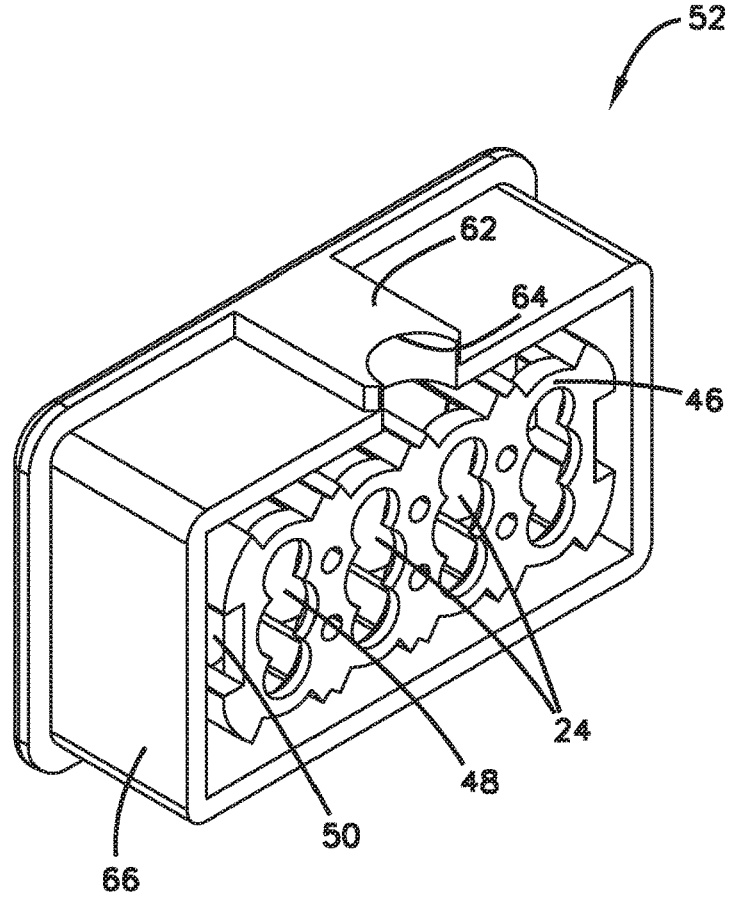
FIG. 3 is another perspective view of the endcap of FIG. 2.
Figure 4:
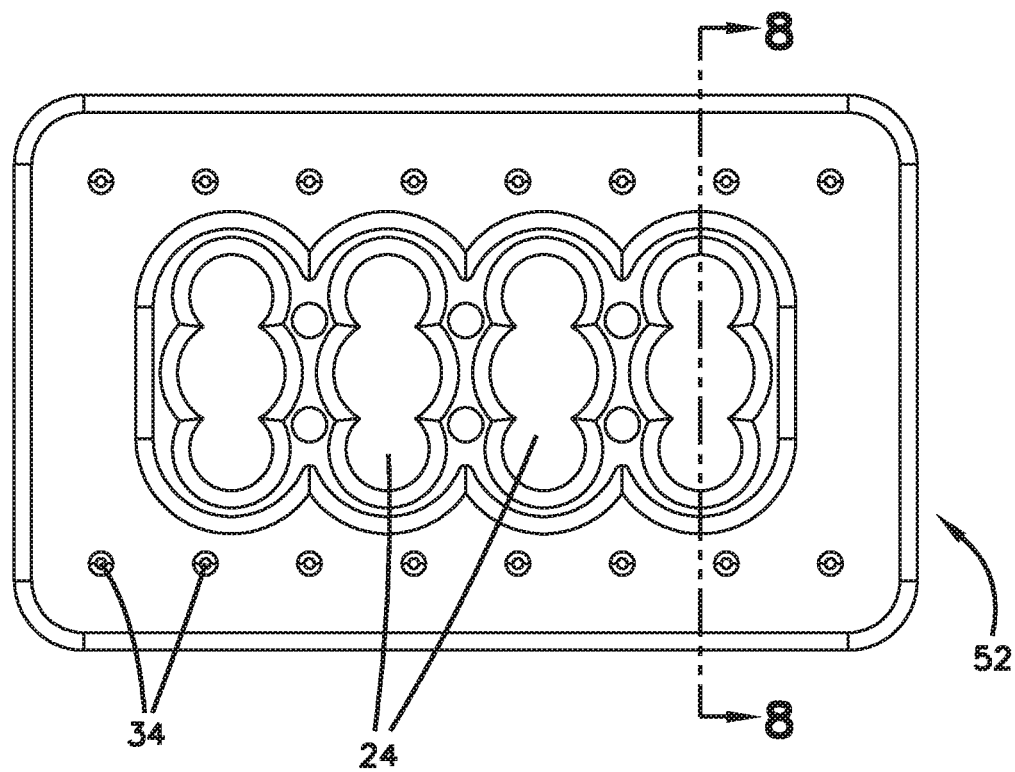
FIG. 4 is a first end view of the endcap of FIG. 2.
Figure 5:
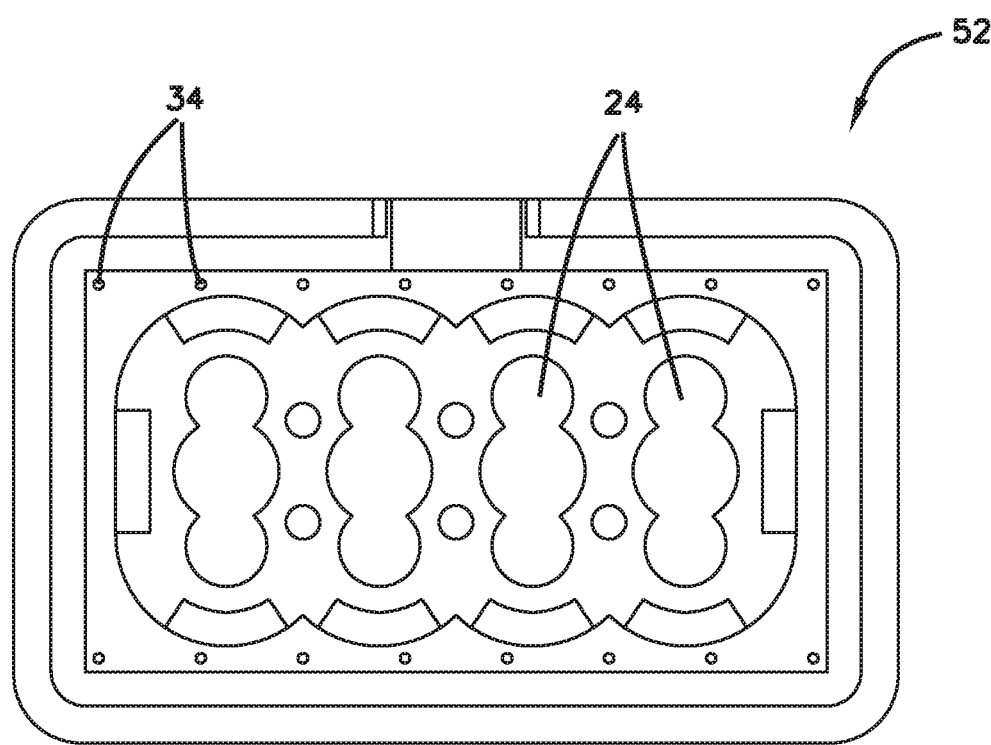
FIG. 5 is an opposite end view of the endcap of FIG. 4.
Figure 6:
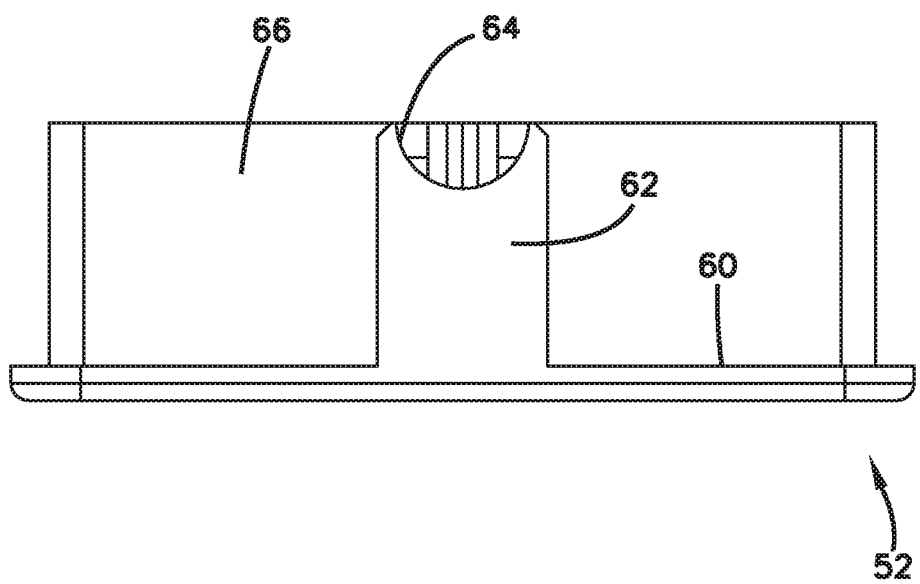
FIG. 6 is a first side view of the endcap of FIG. 2.
Figure 7:
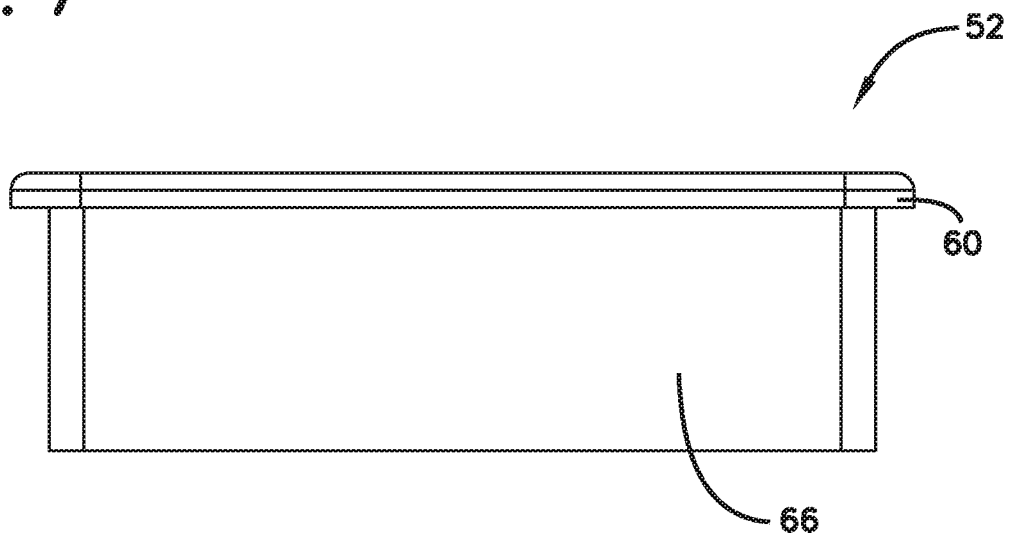
FIG. 7 is an opposite side view of the endcap of FIG. 6.
Figure 8:
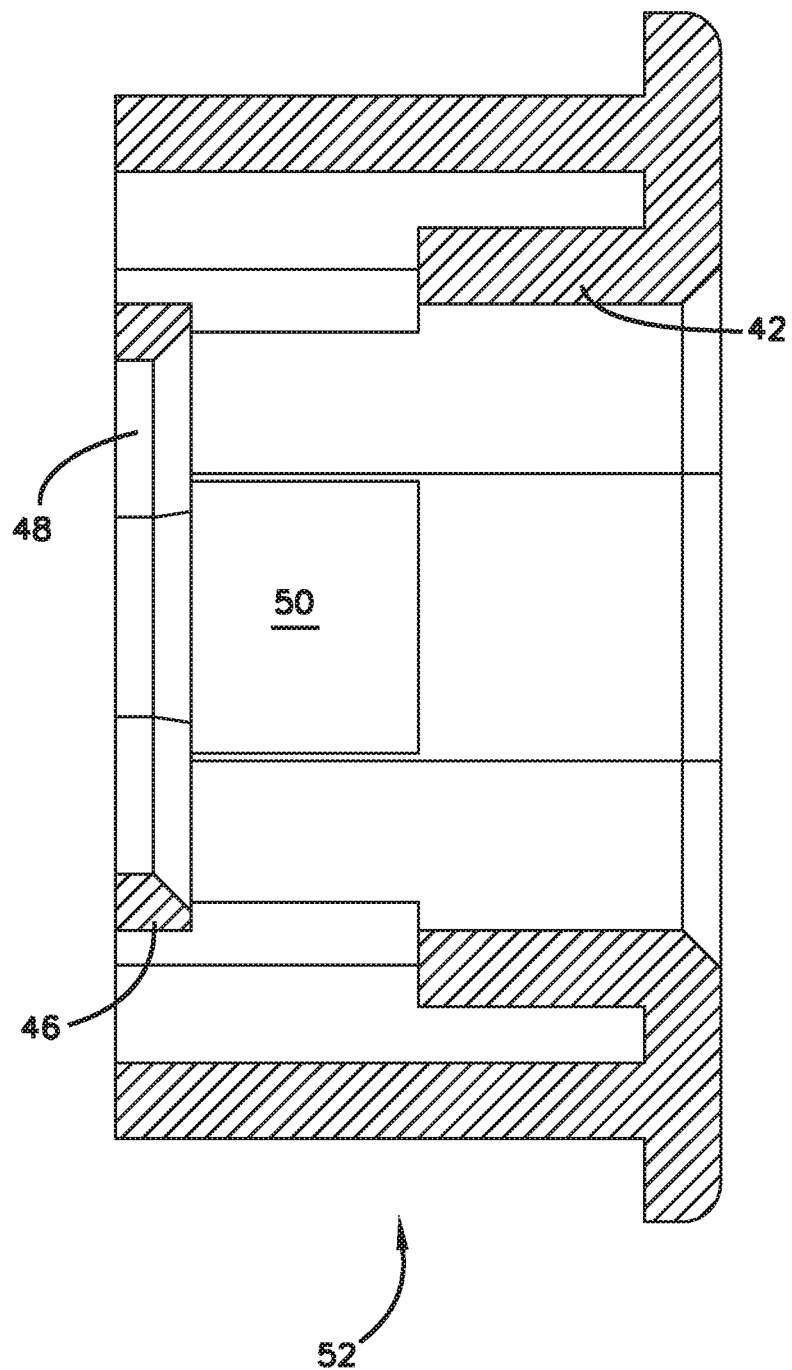
FIG. 8 is a cross-sectional view of the endcap along line 8-8 of FIG. 4, showing portions of the cable seat.
Figure 9:
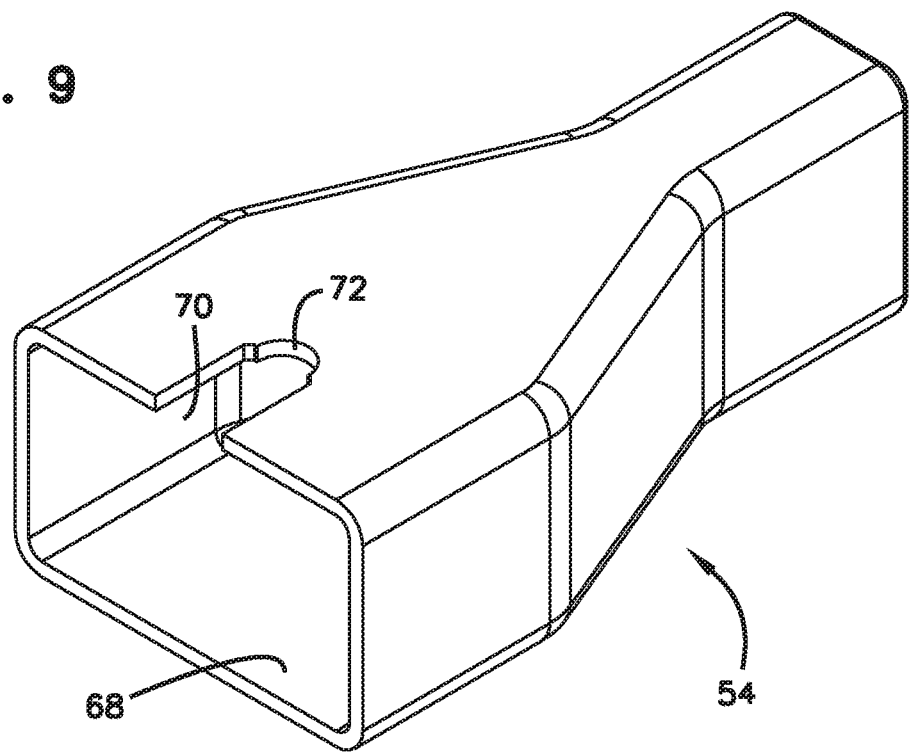
FIG. 9 is a perspective view of the main body of the fiber fanout assembly of FIGS. 1A-1B.
Figure 10:
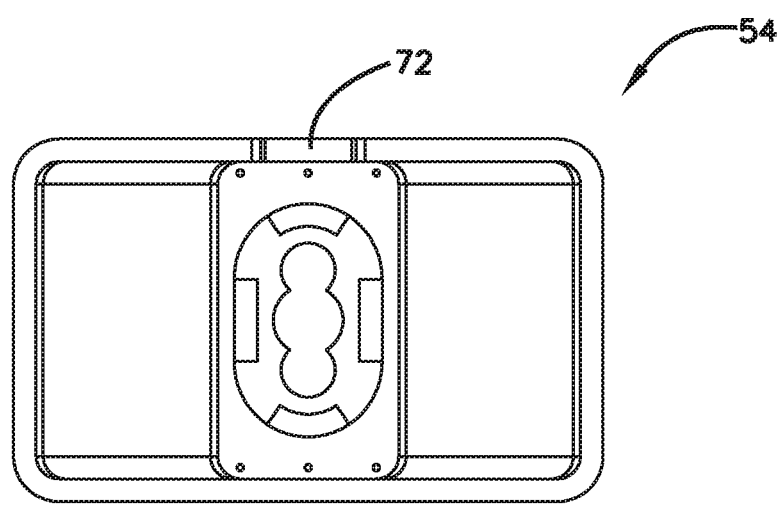
FIG. 10 is a first end view of the main body of FIG. 9.
Figure 11:
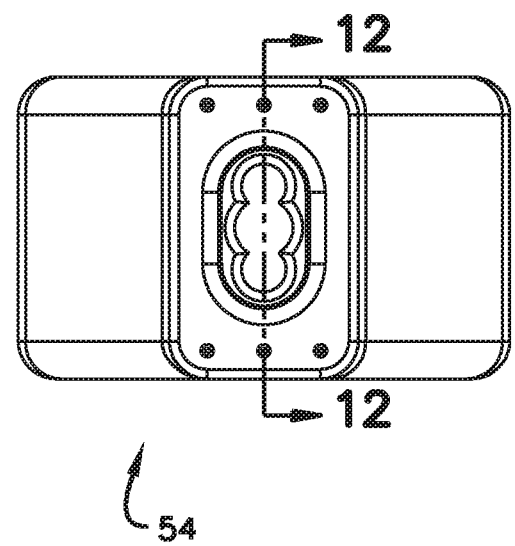
FIG. 11 is an opposite end view of the main body of FIG. 9.
Figure 12:
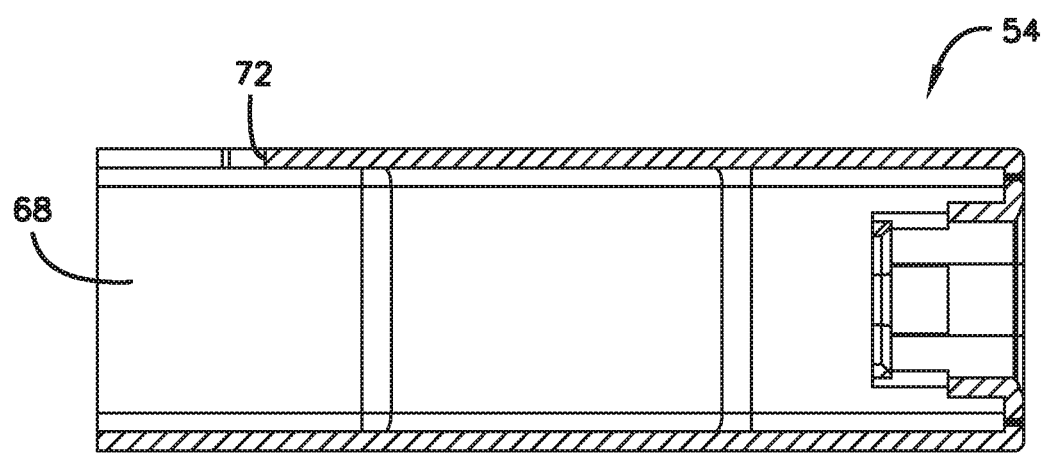
FIG. 12 is a cross-sectional view of the main body along line 12-12 of FIG. 11, showing a cable seat at the opposite end of the main body.
Figure 13:
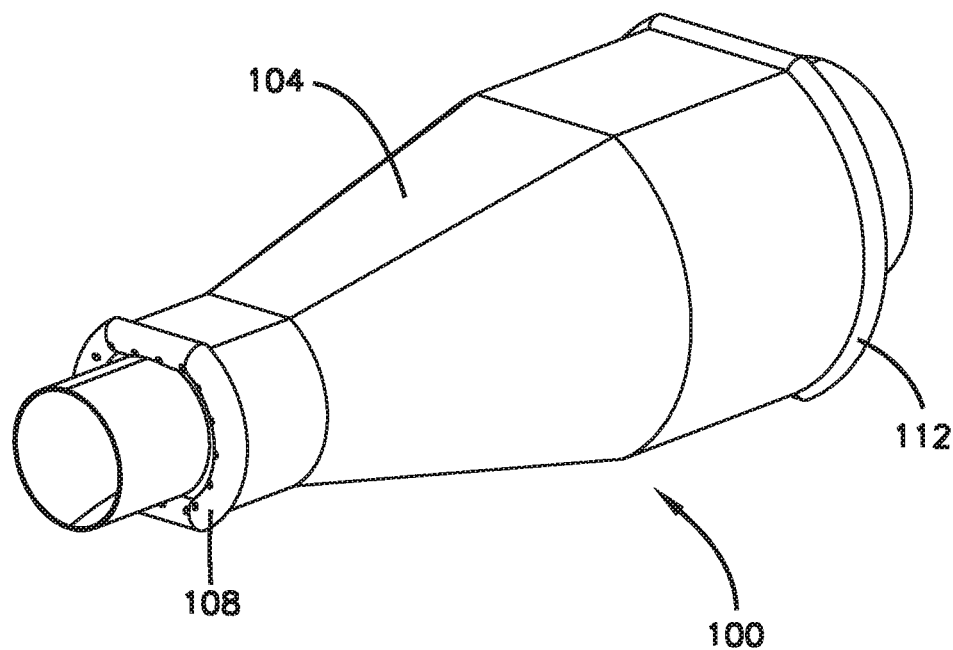
FIG. 13 is a perspective view of a second embodiment of a fiber fanout assembly including a main body including a moldable and/or curable material which forms an exterior surface of the main body.
Figure 14:
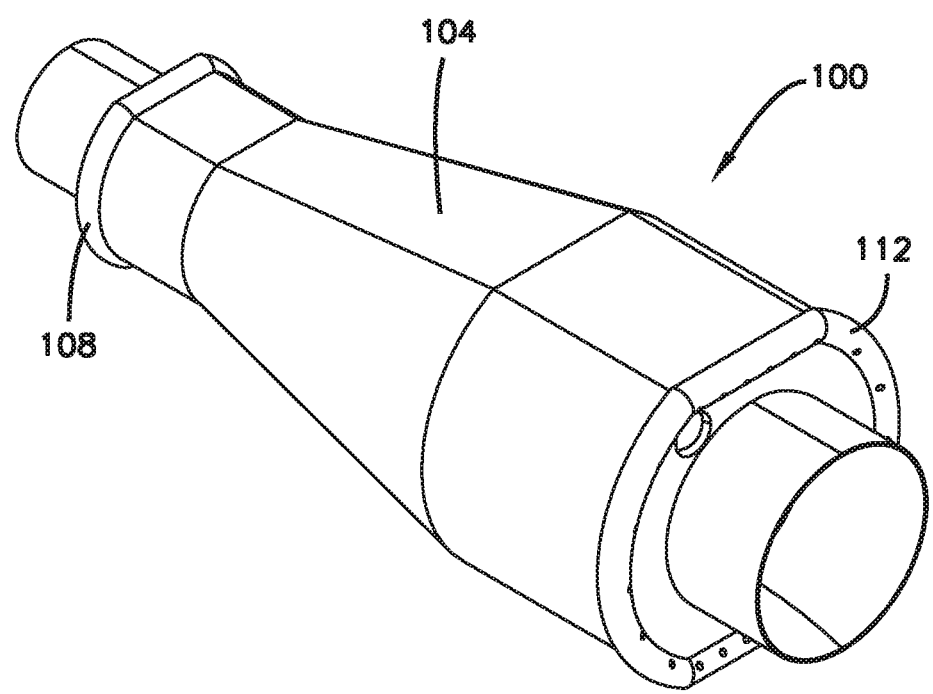
FIG. 14 is a further perspective view of the fanout assembly of FIG. 13.
Figure 15:
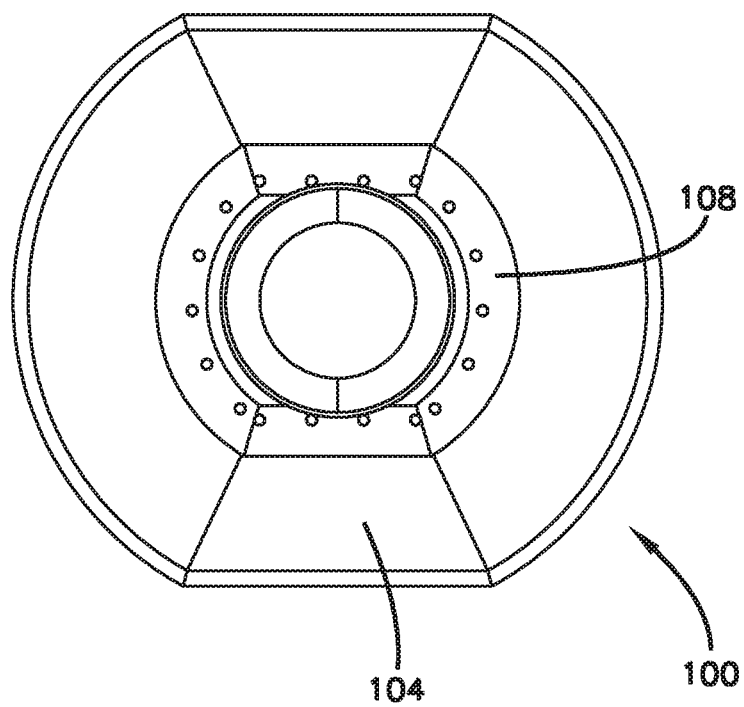
FIG. 15 is a first end view of the fanout assembly of FIG. 13.
Figure 16:
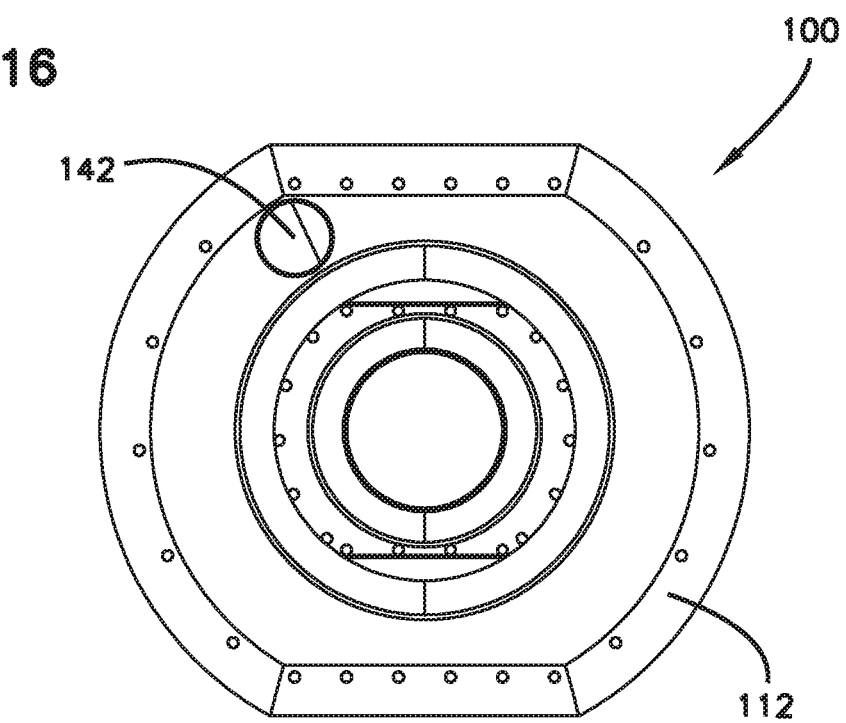
FIG. 16 is an opposite end of the fanout assembly of FIG. 15.
Figure 17:
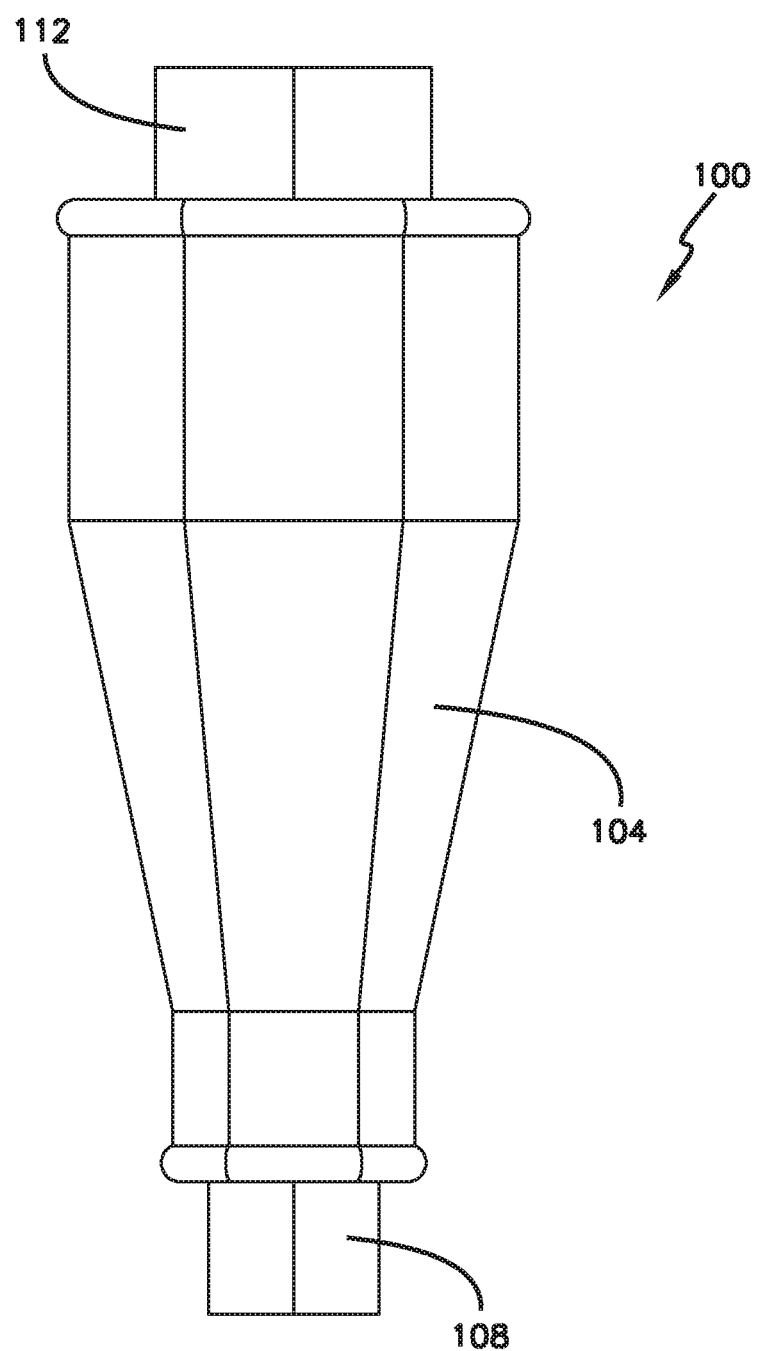
FIG. 17 is a side view of the fanout assembly of FIG. 13.
Figure 18:
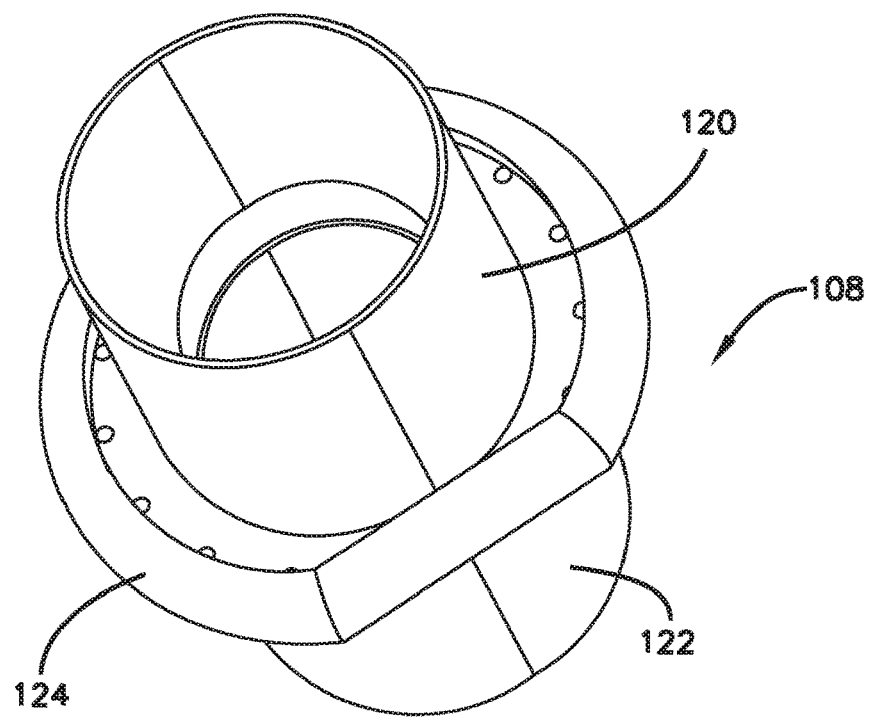
FIG. 18 is a first perspective view of a first endcap of the fanout assembly of FIG. 13.
Figure 19:
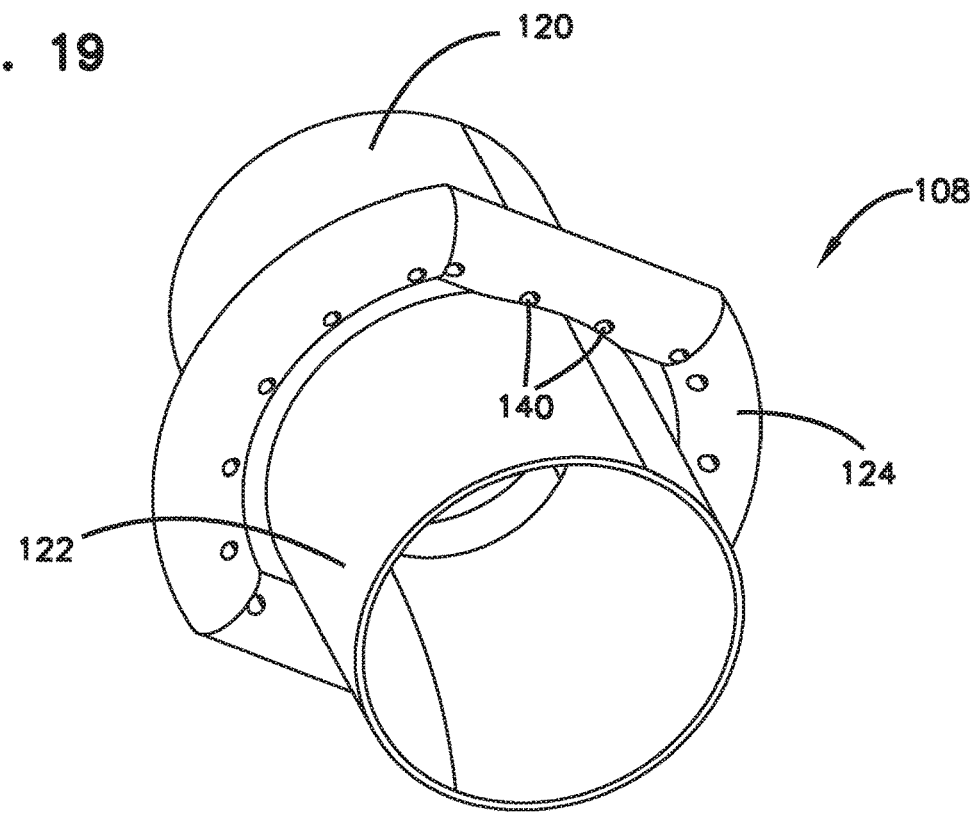
FIG. 19 is another perspective view of the first endcap of FIG. 18.
Figure 20:
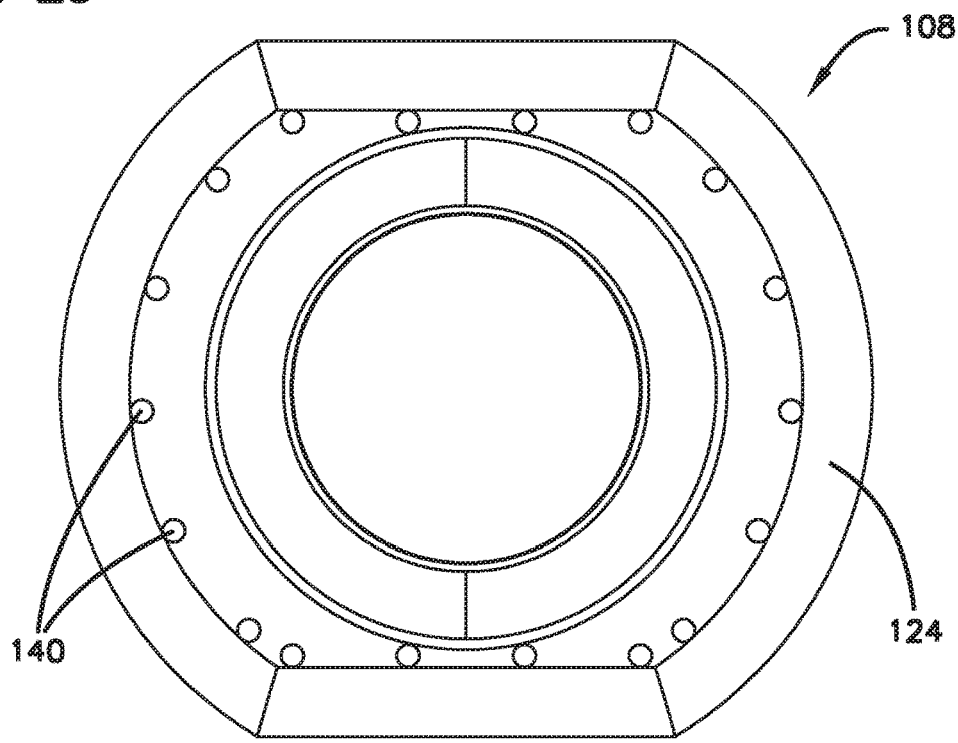
FIG. 20 is a first end view of the endcap of FIG. 18.
Figure 21:
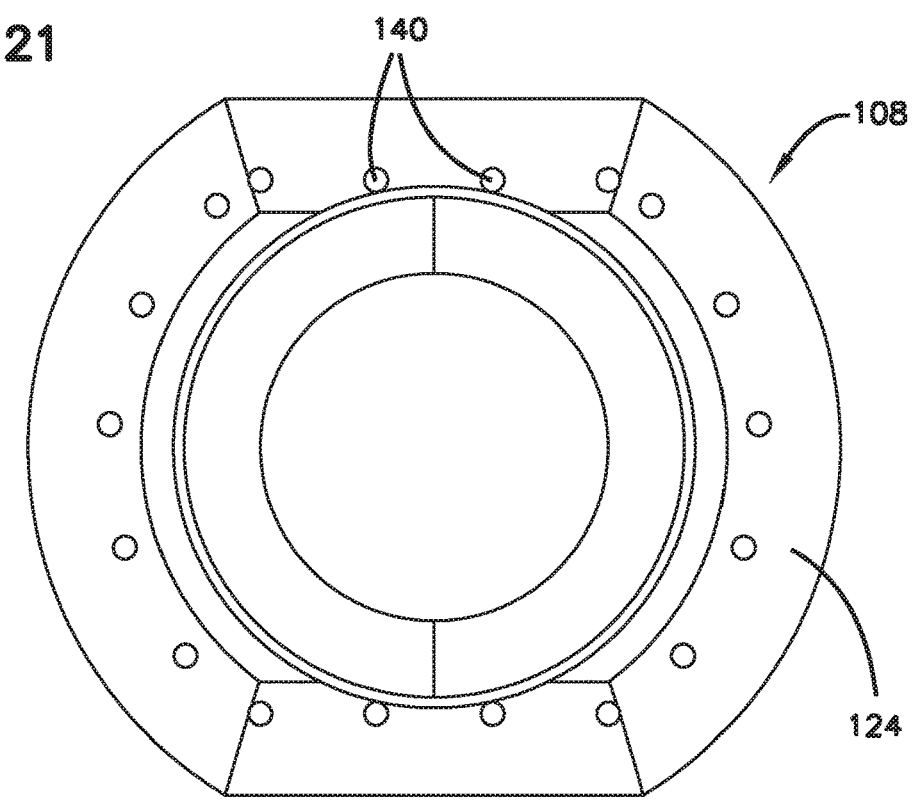
FIG. 21 is an opposite end view of the first endcap of FIG. 20.
Figure 22:
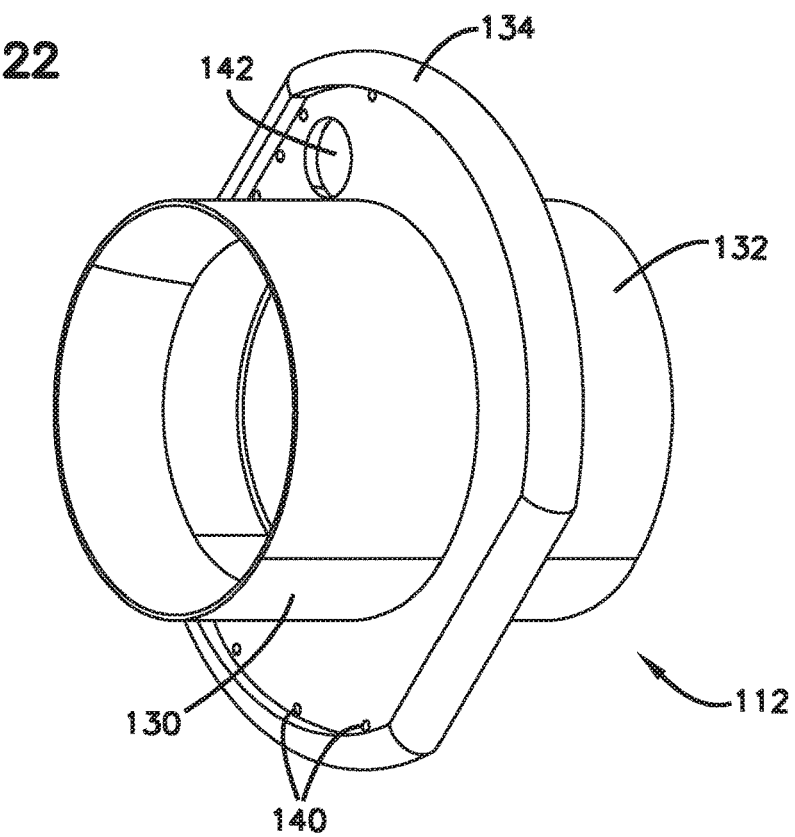
FIG. 22 is a first perspective view of a second endcap of the fanout assembly of FIG. 13.
Figure 23:
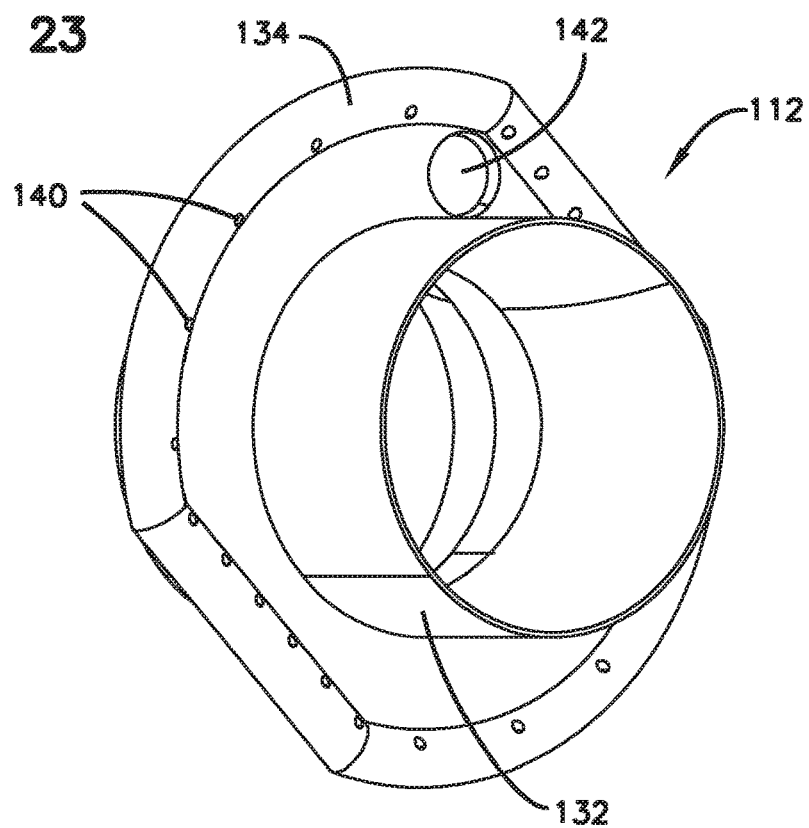
FIG. 23 is another perspective view of the second endcap of FIG. 22.
Figure 24:
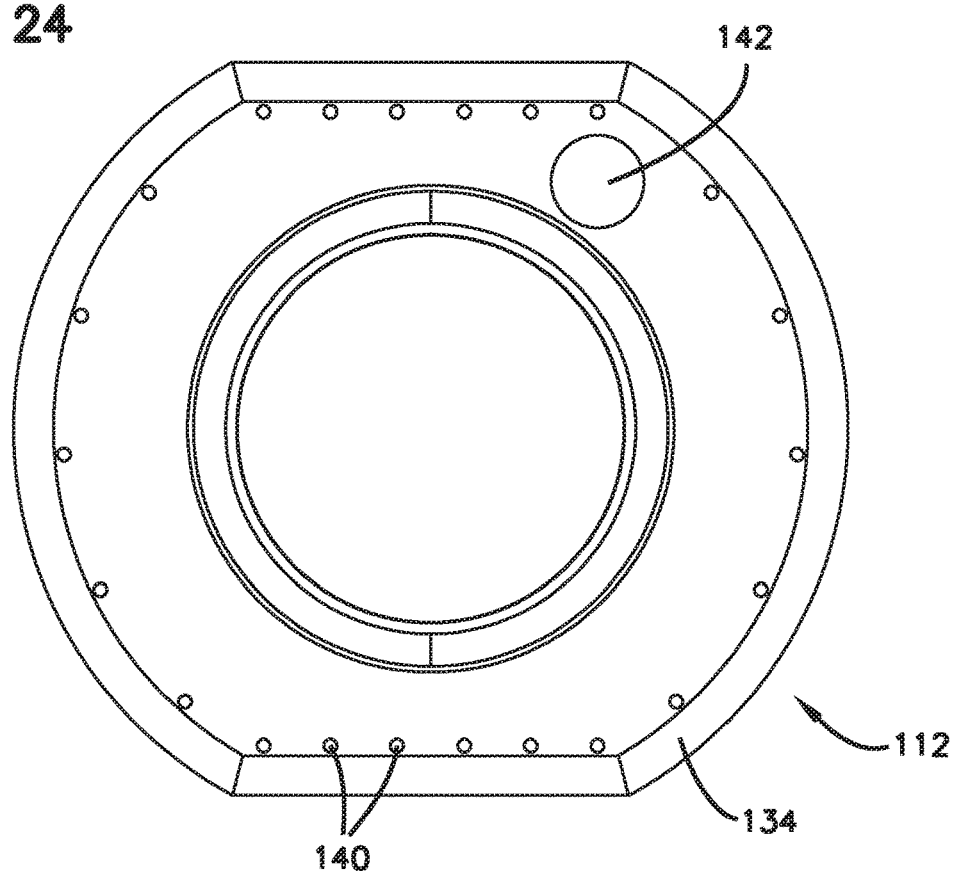
FIG. 24 is a first end view of the second endcap of FIG. 22.
Figure 25:
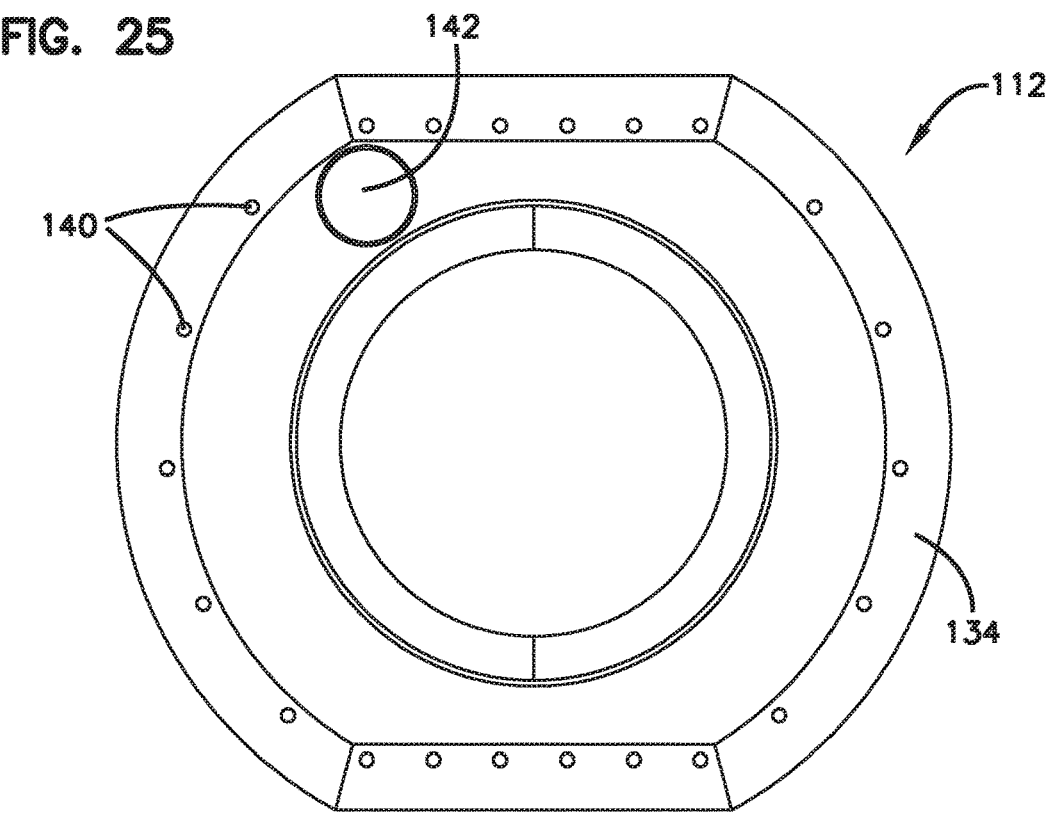
FIG. 25 is an opposite end view of the second endcap of FIG. 24.
Figure 26:
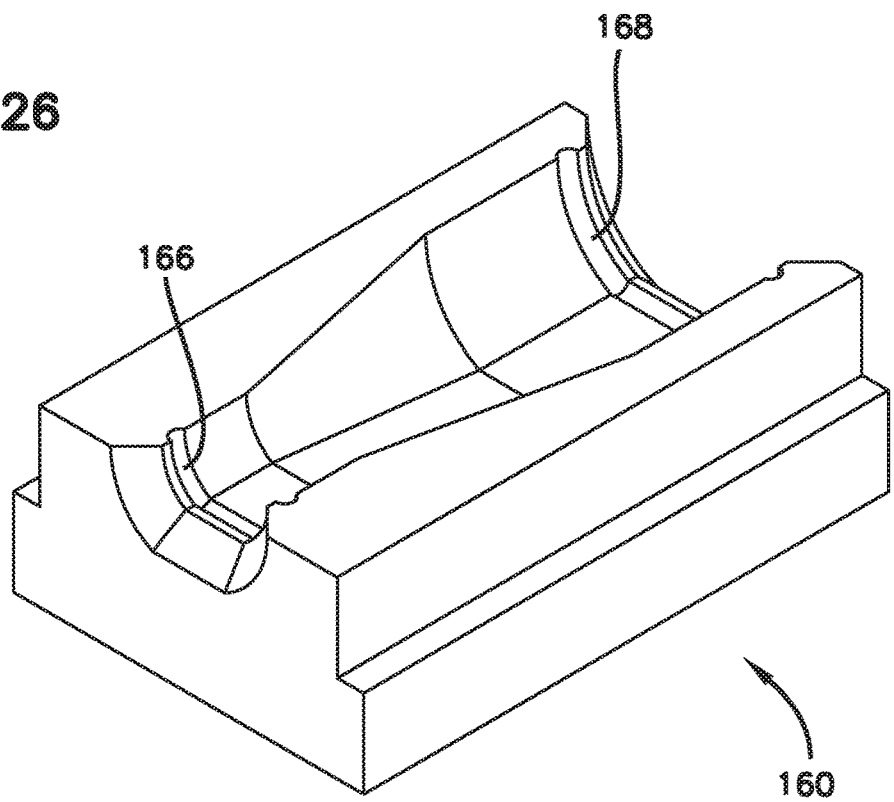
FIG. 26 is a first perspective view of a mold member for use in making the fanout assembly of FIG. 13.
Figure 27:
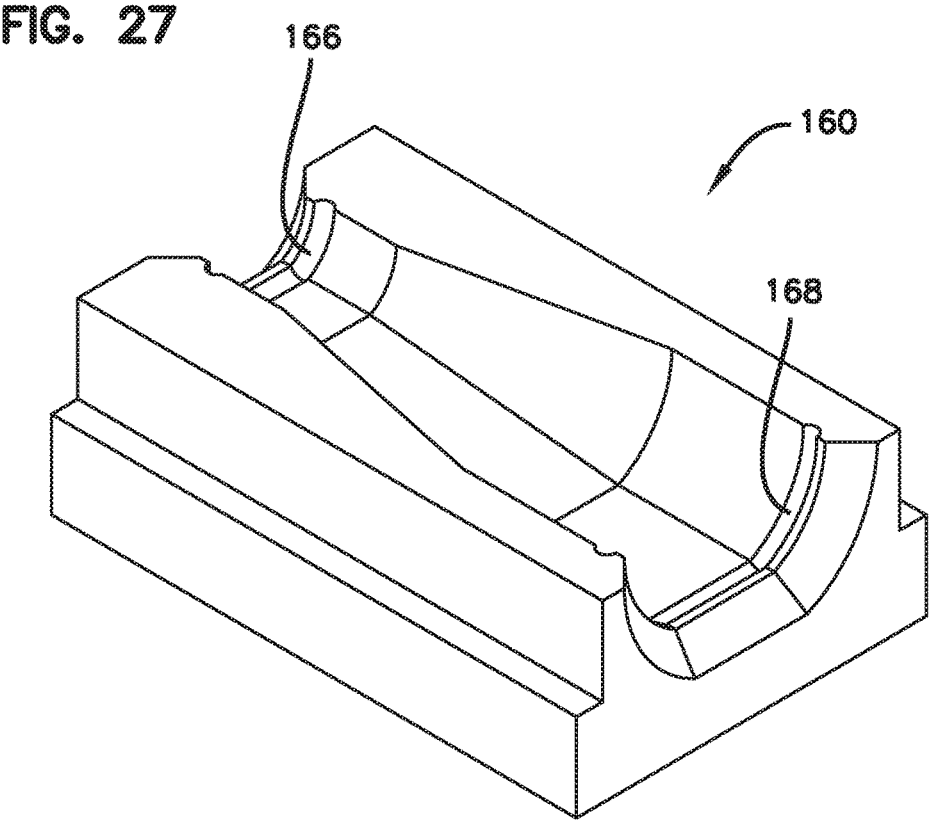
FIG. 27 is another perspective view of the mold member of FIG. 26.
Figure 28:
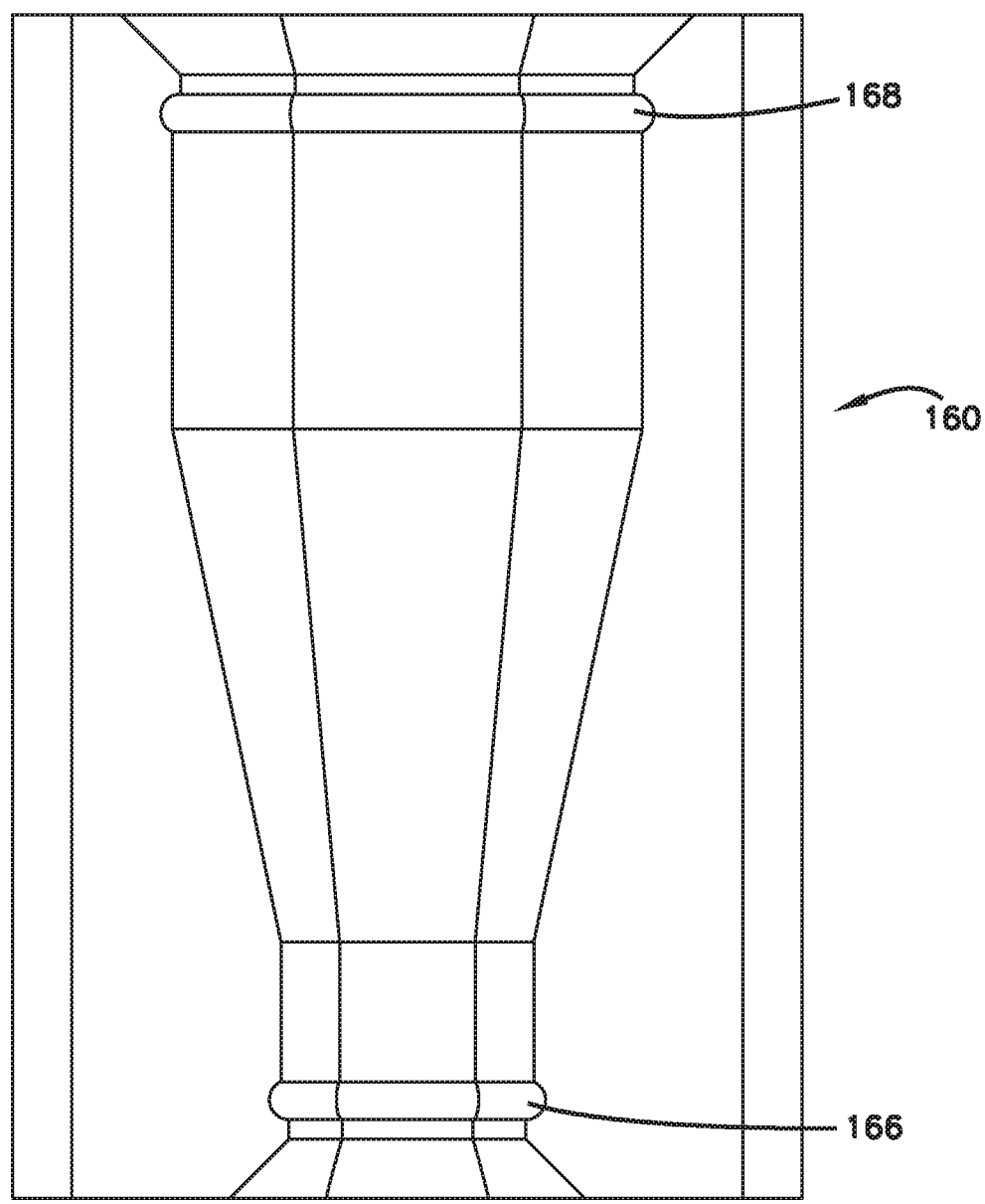
FIG. 28 is a top view of the mold member of FIG. 26.
Figure 29:
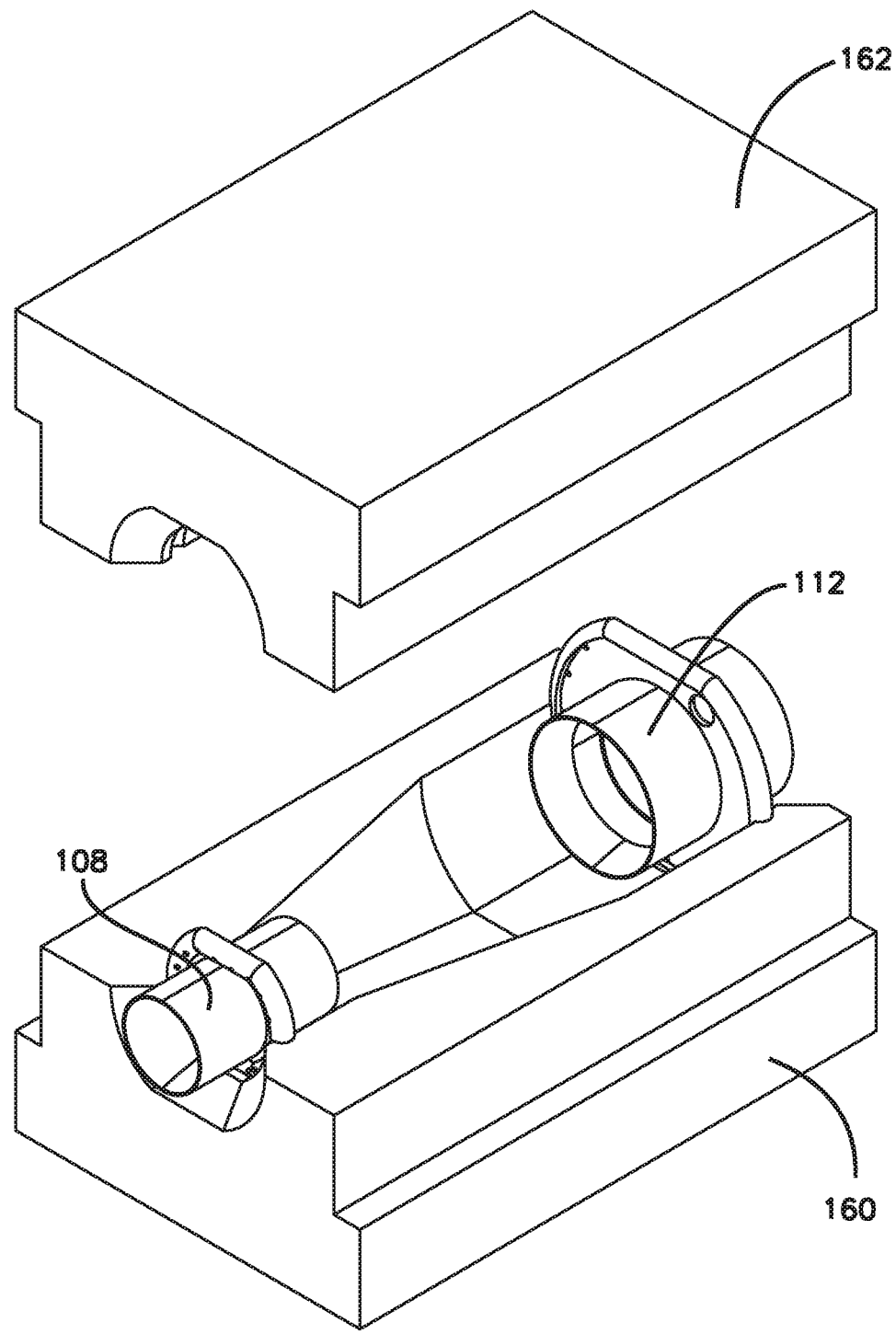
FIG. 29 is a perspective view of the mold member of FIG. 26 with the endcaps of FIGS. 18-25 positioned in the mold member and a similar upper mold member shown in an exploded configuration relative to the mold member.
Figure 30:
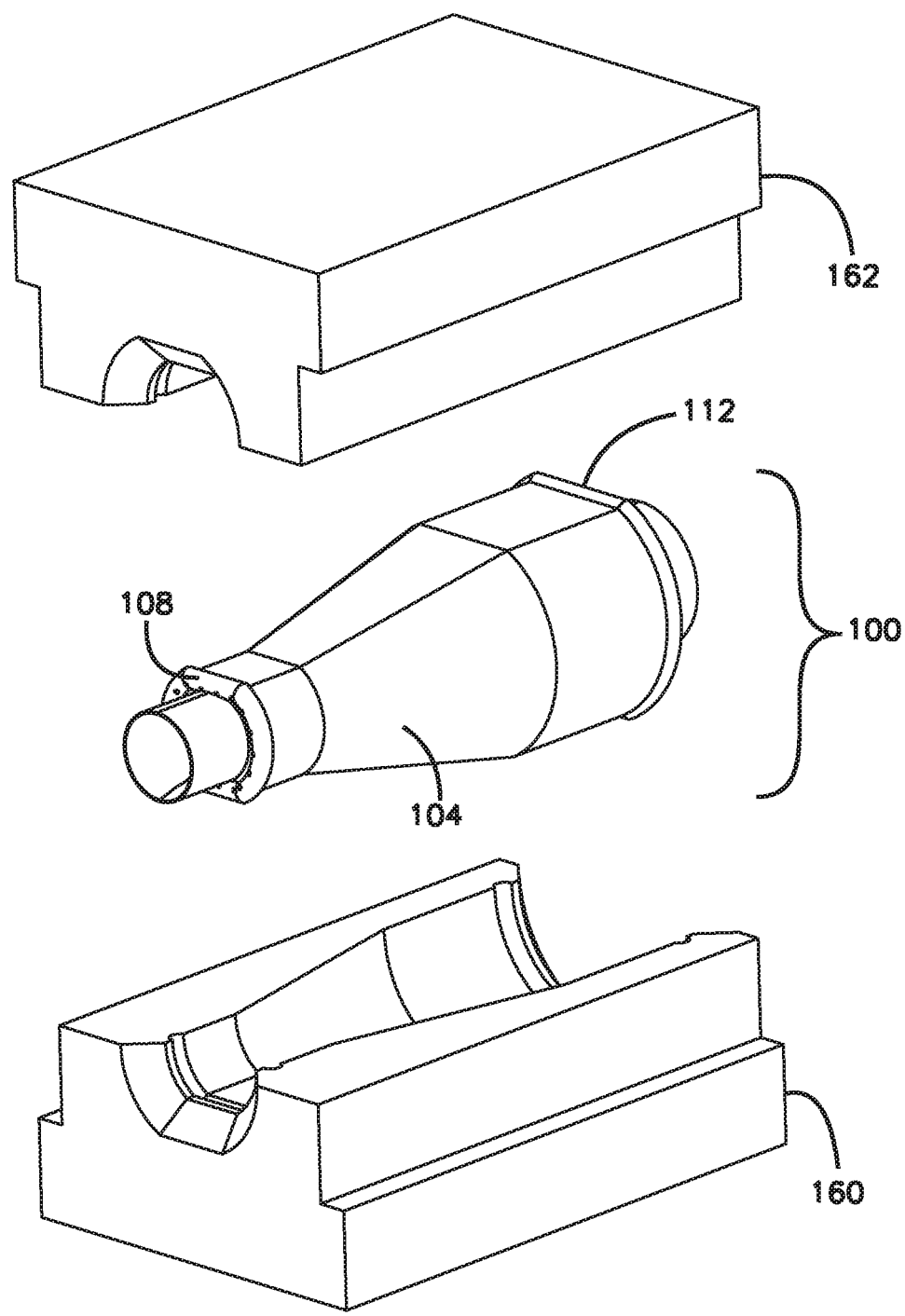
FIG. 30 is a perspective view of two of the mold members of FIG. 26 removed after molding and/or curing of the material between the endcaps to form the fanout assembly of FIG. 13.
Figure 31:
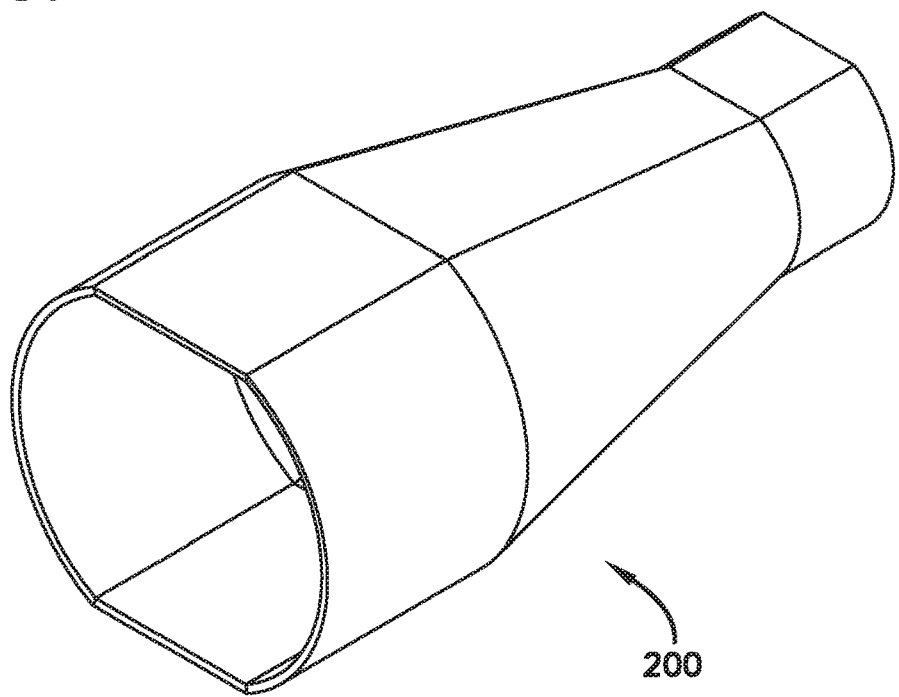
FIG. 31 is a perspective view of a fanout sleeve of another embodiment of a fiber fanout assembly.
Figure 32:
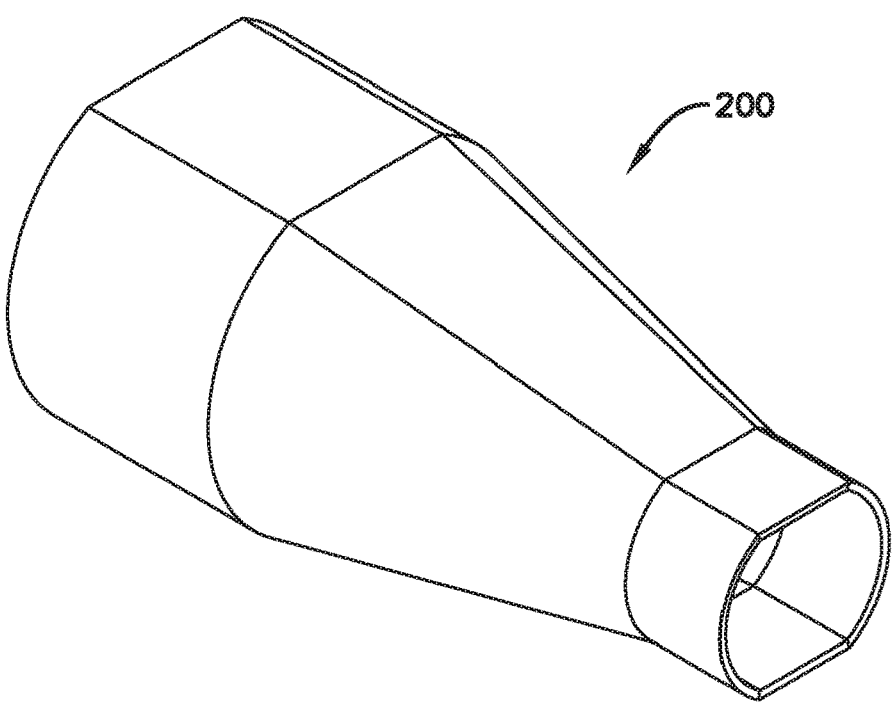
FIG. 32 is a further perspective view of the fanout sleeve of FIG. 31.

Referring now to FIGS. 1A and 1B, a first embodiment of a fanout assembly 10 is shown including a housing 12, a first end 14, and an opposite second end 16. First end 14 defines a first cable opening 22. Second end 16 defines a plurality of cable openings 24. Further features of fanout assembly 10 are shown in FIGS. 2-12.

A first cable, or input cable, enters housing 12 at first end 14. The optical fibers enter through cable opening 22 and pass through an interior of housing 12. The optical fibers extend out of housing 12 at the opposite cable openings 24. The fanout cables, tubes, or conduits are positioned at second end 16 to receive the optical fibers in the desired arrangement.

The input cable and the furcation cables are fixed to housing 12 via a moldable and/or curable material. In the present example, an epoxy can be utilized to fill an interior of housing 12 which fixes the optical fibers exposed between the end of the input cable and the opposite end of housing 12 where the furcation cables begin. The epoxy also fixes the input cable and the furcation cables to housing 12. The epoxy is applied through an epoxy opening 30 in housing 12. Epoxy fills an interior of housing 12, such as from an injection port applied to epoxy opening 30. One or more vent openings 34 are provided to allow air to exit from an interior of housing 12 to allow for a more complete fill of epoxy within the interior of housing 12.

Cable openings 22, 24 can be provided in the form of a cable seat 40 including a sidewall 42 which surrounds an exterior of the cable jacket, or the furcation tube, and an end wall 46 which receives an end of the cable jacket or an end of each furcation cable. A smaller cable opening 48 allows for the optical fibers, any aramid, or strength yarns to enter and pass through housing 12. Cable opening 48 also allows for additional strength members, in the form of fiberglass rod or other strength members to also pass into an interior of housing 12. Cable seat 40 also includes one or more epoxy windows 50 to allow for epoxy to flow from an interior of housing 12 to contact cable jacket of the input cable or the exterior of the furcation cables.

Fanout assembly 10 includes an endcap 52 which is separately formed from main body 54. Endcap 52 includes a rim 60 and a projection 62 defining a curved edge 64. When endcap 52 is mounted at main opening 68 of a main body 54, a sleeve portion 66 is received within main body 54. Main body 54 also includes a slot 70 which receives projection 62 and a curved edge 72 cooperates with curved edge 64 to form epoxy opening 30.

One example epoxy is from Loctite Corporation, UK 3364. Such an epoxy is one example of an epoxy that maintains its desired properties in severe environments as a potting material and meets V0 flame ratings. It has low to moderate viscosity when first mixed and adheres to the various elements in fanout assembly 10. According to one embodiment, the epoxy may have a viscosity of less than 5000 centipoise (cp) after mixing/during dispensing such that it flows readily. A preferred viscosity after mixing is less than 2000 cp.

Regarding working and curing times for the epoxy, it has been found that the epoxy has a pot life, or working life/time of approximately 30-60 seconds, and the epoxy cures enough to allow subsequent processing of the fanout assembly 10 in approximately 5 minutes. According to one embodiment, the working time is less than 60 seconds. According to another embodiment, the working time is preferably less than 30 seconds. In an example epoxy for use with the fanouts of the present disclosure, the surfaces thereof are no longer tacky within 10 minutes, preferably within 5 minutes.

According to one embodiment, the example epoxy may be dark or black in color, due to addition of carbon black materials. The black color can hide internal components for cosmetic reasons and protects internal components from exposure to UV light.

Regarding environmental exposure, according to an example embodiment, the epoxy used does not swell more than 1% or dissolve when exposed to humidity or solvents including water, alcohols, kerosene, gasoline, and diesel fuel.

Referring now to FIGS. 13-30, the above-noted epoxy itself can be used to form a main body without an extra exterior structure between the ends. Such a fanout assembly 100 includes a main body 104, a first endcap 108, and a second endcap 112.

As will be described below, main body 104 is formed from an epoxy material that is formed within a mold around the input cable and the furcation cables. First endcap 108 has a first sleeve 120, an opposite second sleeve 122, and a rim 124. Second endcap 112 includes a first sleeve 130, an opposite second sleeve 132, and a rim 134. Both endcaps 108, 112 include air vent holes 140 in rim 124 and rim 134. Second endcap 112 includes an epoxy fill hole 142 for filling an interior of a mold with epoxy to surround the ends of the input cable, the furcation cables, and the exposed optical fibers. As shown in the figures, first and second mold members 160, 162 form mold halves which together form an enclosed molding area for forming the main body 104 made from the epoxy material. Each mold member 160, 162 includes a first groove 166 for first endcap 108, and a second groove 168 for second endcap 112 to be held by the adjacent mold halves 160, 162. Epoxy filled into the void of the mold through epoxy fill hole 142 is allowed to cure and create fanout assembly 100.

Figure 33:
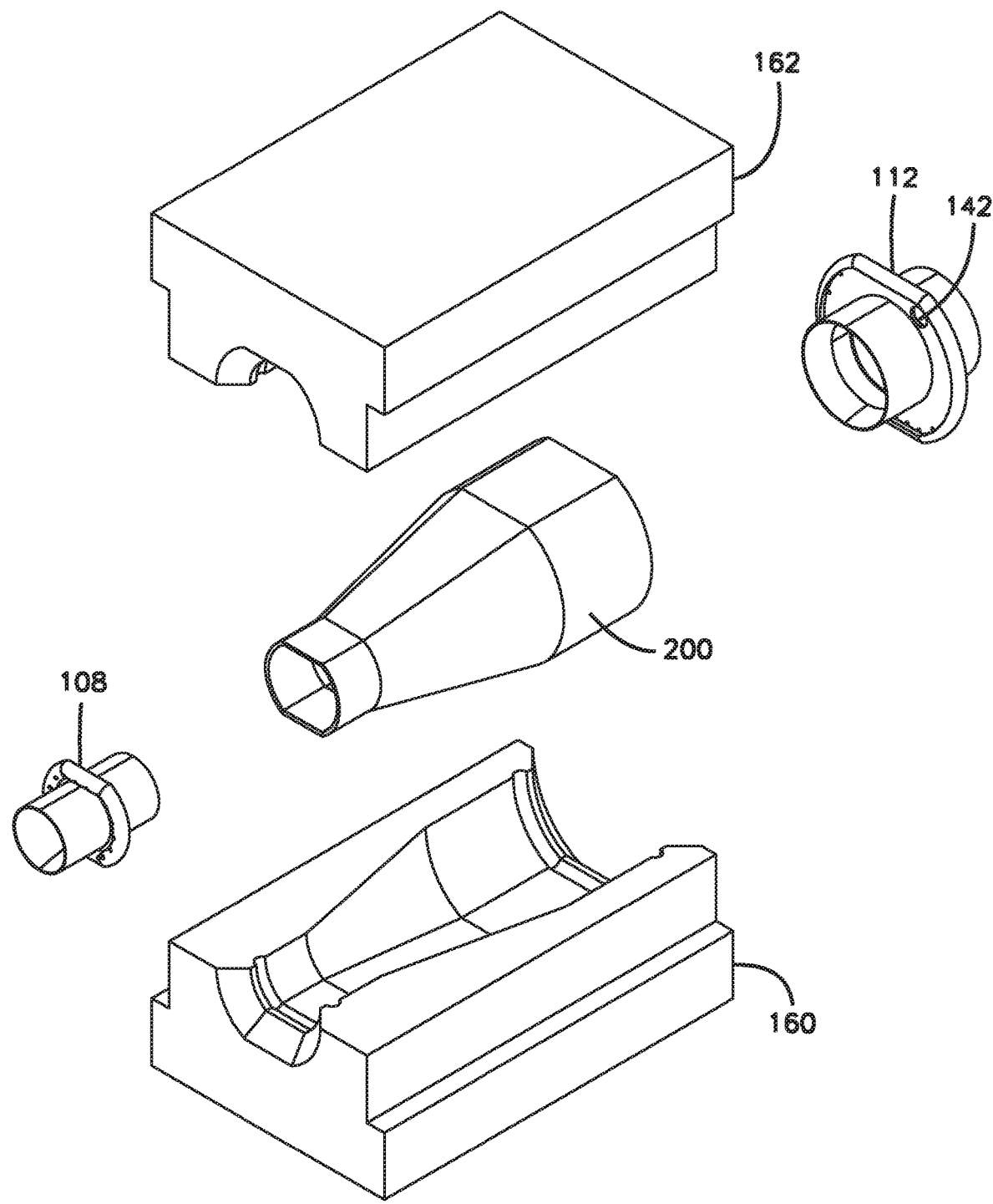
FIG. 33 shows the fanout sleeve of FIGS. 31-32 prior to assembly with two endcaps via a fixture defined by one or more mold members to form a fiber fanout assembly.
Figure 34:
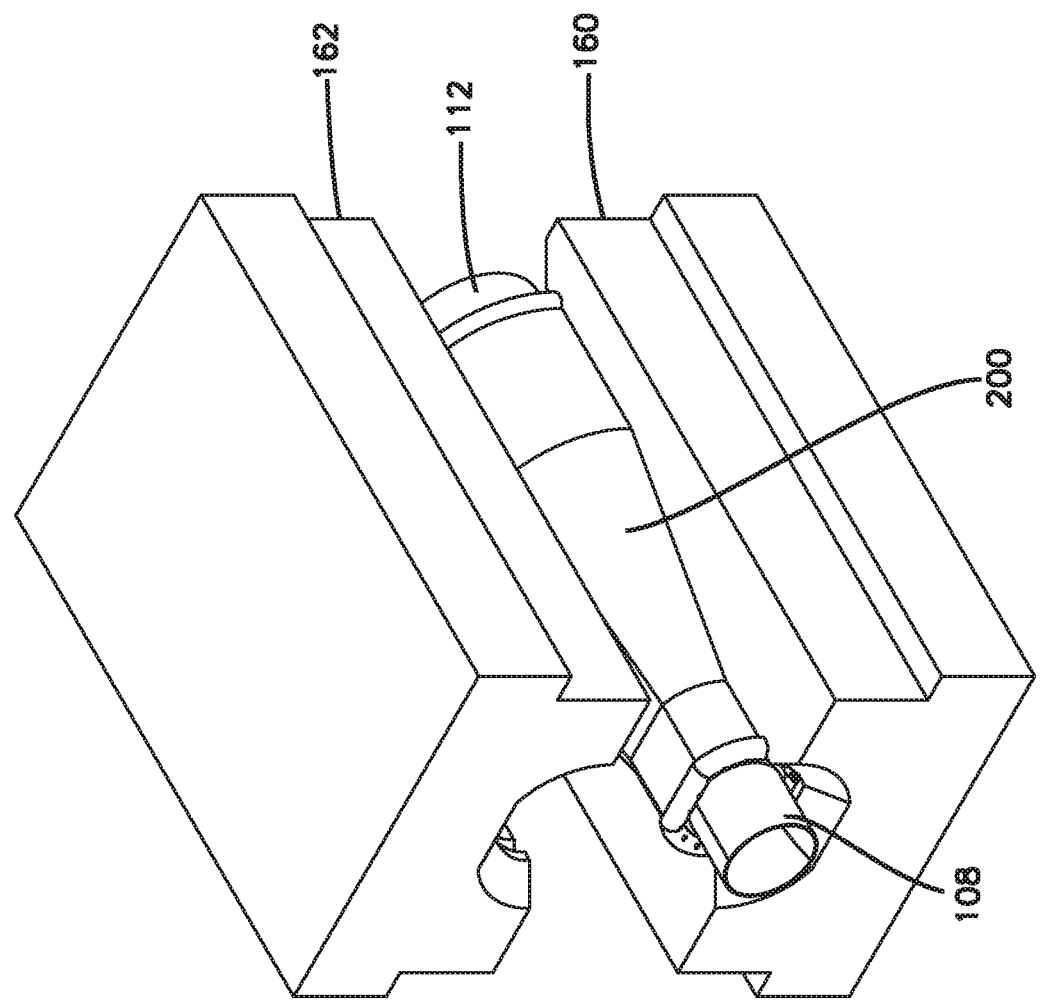
FIG. 34 shows the fanout sleeve and the two endcaps positioned in one of the mold members of FIG. 33 being used as a fixture.
Figure 35:
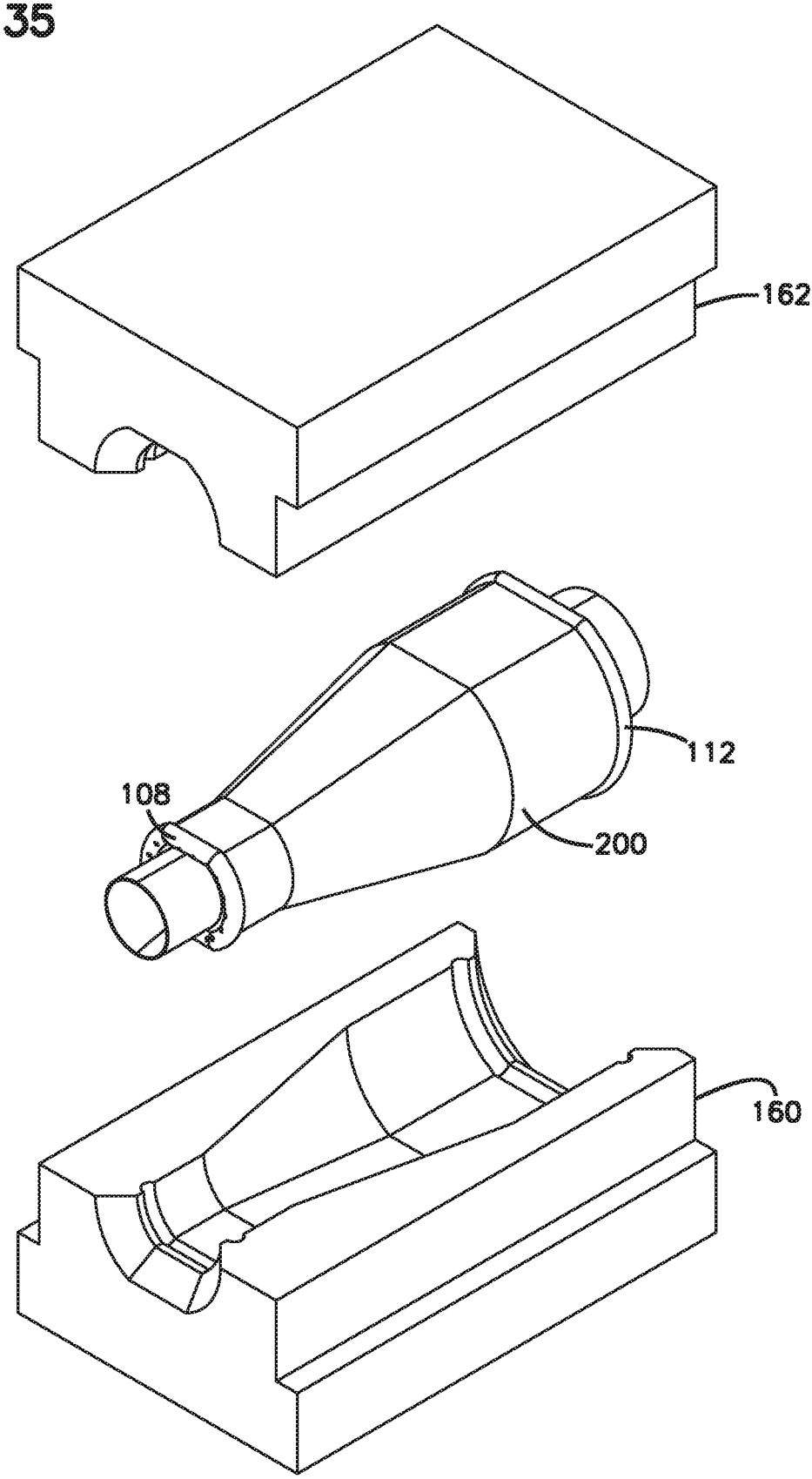
FIG. 35 shows the fixture defined by one or more mold members of FIG. 33 removed from the fanout assembly.

Referring now to FIGS. 31-35, according to another embodiment of a fiber fanout assembly, a physical structure such as a fanout sleeve 200 (shown in isolation in FIGS. 31-32) can be provided for use with first endcap 108 and second endcap 112 to provide an interior void for receiving epoxy through epoxy fill hole 142. Fanout sleeve 200 can be positioned adjacent to each endcap 108, 112 and held by a fixture, such as the mold member 160. An upper mold member 162 can also be used, if desired, as shown in FIGS. 33-35. Using mold member 160 (or, in addition, mold member 162) as a fixture allows for endcaps 108, 112 to be positioned adjacent to fanout sleeve 200 without extra support or fixation between them.

Figure 36:
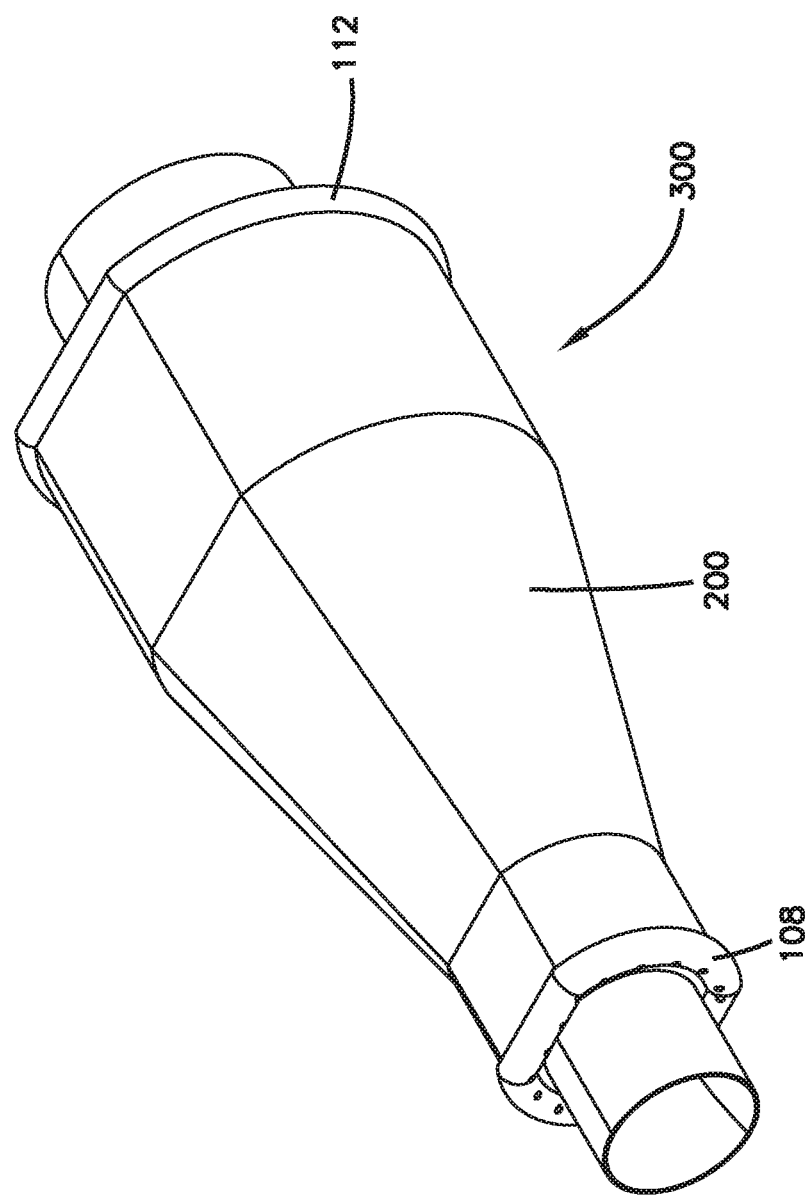
FIG. 36 shows another embodiment of a fiber fanout assembly including two endcaps attached to a fanout sleeve prior to the fanout sleeve being filled with moldable and/or curable material.
Figure 37:
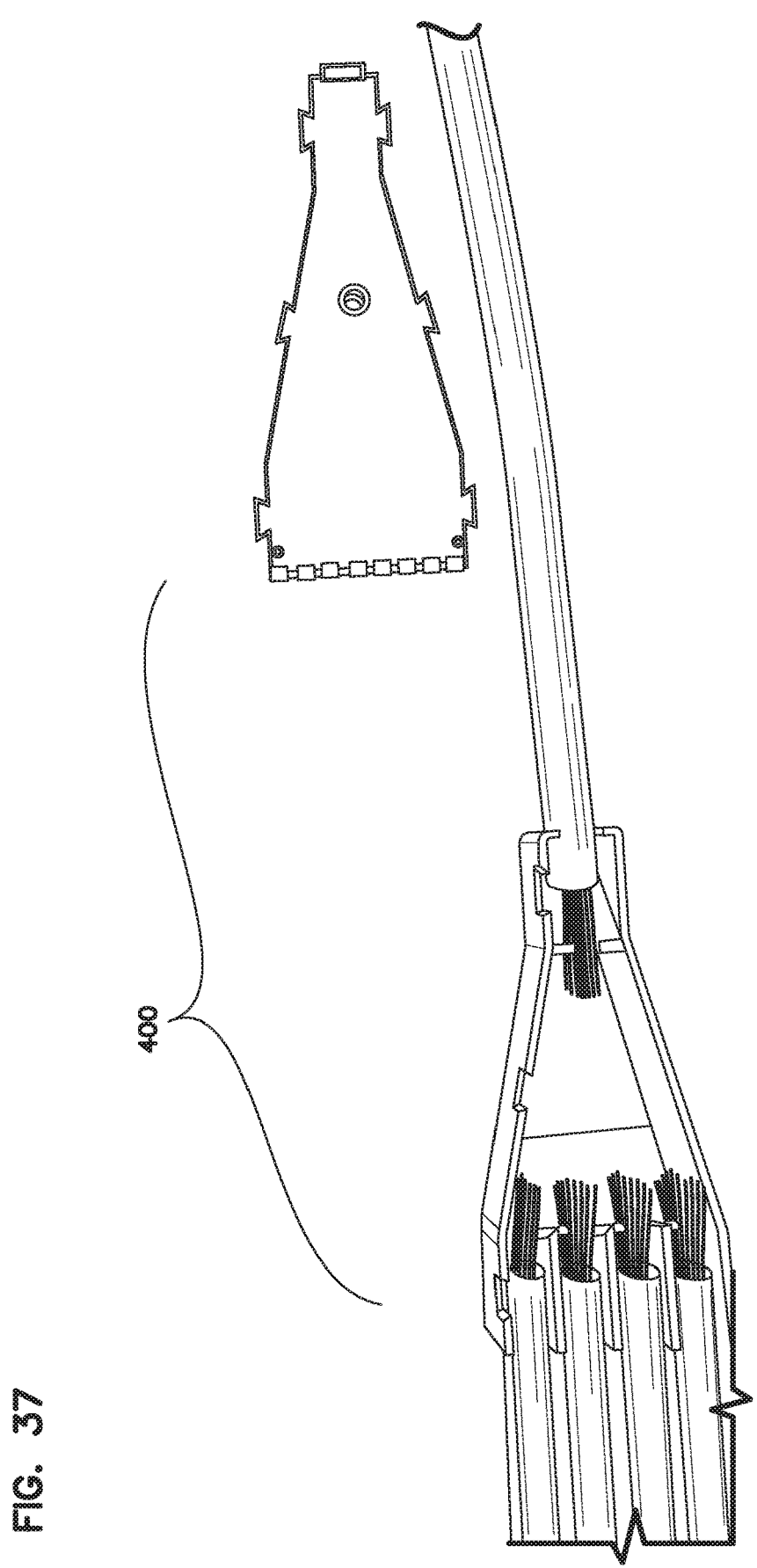
FIG. 37 shows a generally planar fanout assembly in one example embodiment of a fanout shape, and including generally rectangular ends.

As illustrated in a further embodiment of a fiber fanout assembly 300 in FIG. 36, if a fixture is not desired, fixation elements (such as friction-fit elements, clips, or snaps) between endcaps 108, 112 and fanout sleeve 200 can be provided, and then epoxy can be used to fill the interior void through epoxy fill hole 142.

In one embodiment, endcaps 108, 112 can be low-cost molded parts which can be varied depending on the nature of the desired fanout assembly 100/300. Also, different molds 160, 162 can be provided to change the length of a fanout assembly 100/300.

Figure 38:
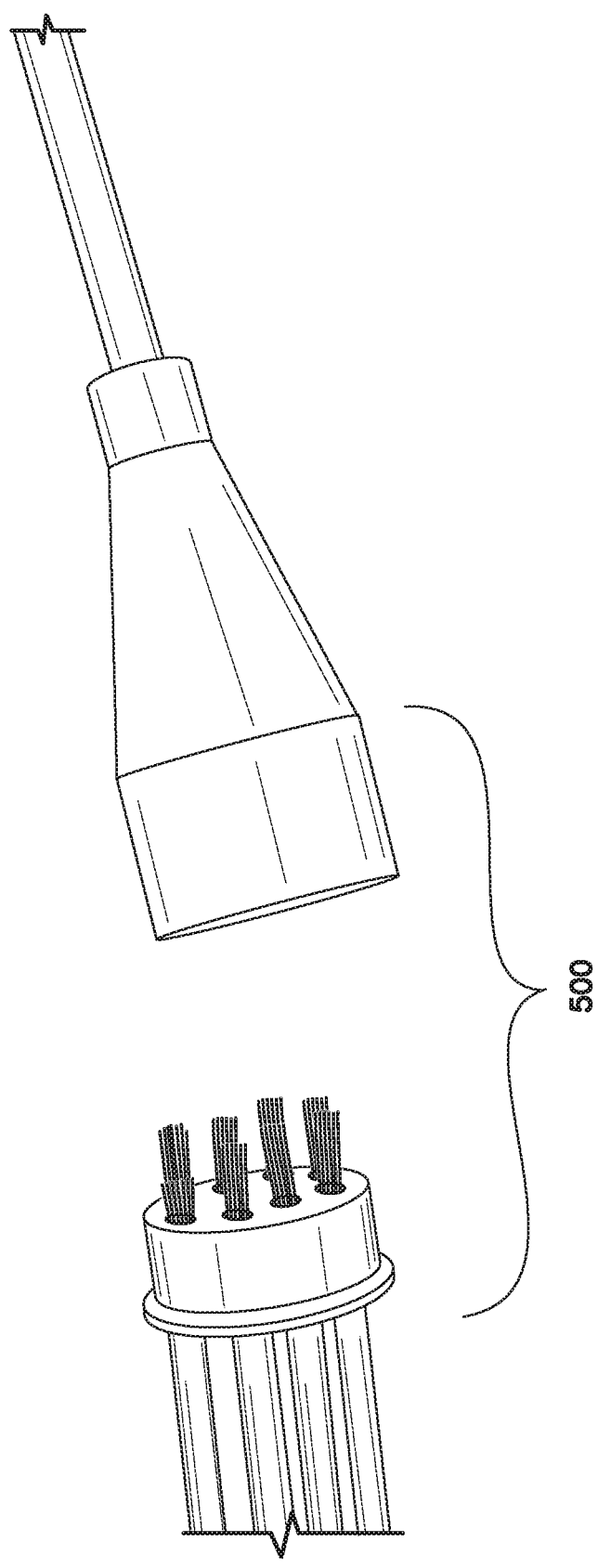
FIG. 38 shows a different fanout assembly including a conical shape with circular ends.

It is to be appreciated that fanout sleeve 200 or housing 12 can be translucent to allow for observation of proper fiber positioning, cable positioning, tube positioning, and epoxy fill, as illustrated in FIG. 38.

In the case of forming the fiber fanout assembly 100, where epoxy itself is used to form a main body without an extra exterior structure, such as a fanout sleeve 200, a technician can observe proper placement of the fibers, the input cable, and the furcation cables relative to the endcaps 108, 112 using the mold member 160. Thereafter, the upper mold member 162 is placed over the mold member 160 for epoxy fill.

As discussed above, the fiber fanout assemblies and the main bodies thereof of the present disclosure may take on different shapes and forms according to the desired connectivity need. For example, in FIG. 37, an example of a fiber fanout assembly 400 that includes a generally planar shape with generally rectangular ends is shown. FIG. 38, as another example, illustrates a fiber fanout assembly 500 including a conical shape with circular ends.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An optical fiber fanout assembly comprising:
a body having an inlet end and an outlet end defined by a funnel-shaped body part;
a first endcap positioned at the inlet end;
a second endcap positioned at the outlet end;
wherein a first cable extends to the inlet end of the funnel-shaped body part;
wherein a second cable has a first end which extends to the outlet end of the funnel-shaped body part;
optical fibers passing through between the first and second cables through the funnel-shaped body part;
a moldable and/or curable material within the funnel-shaped body part, the moldable and/or curable material extending from the first end cap to the second end cap;
vent holes located in the first and second endcaps, for venting air from the funnel-shaped body part; and
a fill hole located in the funnel-shaped body part for filling the moldable and/or curable material within the funnel-shaped body part.

2. The optical fiber fanout assembly of claim 1, wherein the second endcap has a larger cable opening than a cable opening of the first endcap.

3. A method of making the optical fiber fanout assembly of claim 1, wherein a fixture holds the first endcap and the second endcap adjacent to the funnel-shaped body part, wherein the moldable and/or curable material can be inserted into an interior of the funnel-shaped body part.

4. The optical fiber fanout assembly of claim 1, wherein the body defines a nonplanar shape having a smaller inlet end and a larger outlet end.

5. The optical fiber fanout assembly of claim 1, wherein the body has a planar shape with a smaller inlet end and a larger outlet end.

6. The optical fiber fanout assembly of claim 1, wherein portions of the optical fiber fanout assembly are translucent to allow observation of an interior of the optical fiber fanout assembly before and/or during application of the moldable and/or curable material.

7. The optical fiber fanout assembly of claim 1, further comprising a cable seat at at least one of the inlet end or the outlet end, wherein the cable seat receives a jacket of the first cable in a recessed area, and wherein a window is in communication with the recessed area to allow for the moldable and/or curable material to contact the jacket of the first cable.

8. An optical fiber fanout assembly comprising:
a body having an inlet end and an outlet end defined by a funnel-shaped body part;
a first endcap positioned at the inlet end;
a second endcap positioned at the outlet end;
wherein a first cable extends to the inlet end of the funnel-shaped body part;
wherein a second cable has a first end which extends to the outlet end of the funnel-shaped body part;
optical fibers passing through between the first and second cables through the funnel-shaped body part; and
a moldable and/or curable material within the funnel-shaped body part;
wherein portions of the optical fiber fanout assembly are translucent to allow observation of an interior of the optical fiber fanout assembly before and/or during application of the moldable and/or curable material.

9. An optical fiber fanout assembly comprising:
a body having an inlet end and an outlet end defined by a funnel-shaped body part;
a first endcap positioned at the inlet end;
a second endcap positioned at the outlet end;
wherein a first cable extends to the inlet end of the funnel-shaped body part;
wherein a second cable has a first end which extends to the outlet end of the funnel-shaped body part;
optical fibers passing through between the first and second cables through the funnel-shaped body part;
a moldable and/or curable material within the funnel-shaped body part; and
a cable seat adjacent to at least one of the inlet end or the outlet end, wherein the cable seat receives a jacket of the first cable in a recessed area, and wherein a window is in communication with the recessed area to allow for the moldable and/or curable material to contact the jacket of the first cable.

10. An optical fiber fanout assembly comprising:
a body formed by a moldable and/or curable material using a mold member, the body having an inlet end and an outlet end defined by a funnel-shaped body part;
a first endcap positioned at the inlet end, the first endcap including a first rim;
a second endcap positioned at the outlet end, the second endcap including a second rim;
wherein a first cable extends to the inlet end of the funnel-shaped body part;
wherein a second cable has a first end which extends to the outlet end of the funnel-shaped body part;
optical fibers passing through between the first and second cables through the funnel-shaped body part;
vent holes located in the first and second rims for venting air from the funnel-shaped body part; and
a fill hole located in the second endcap for filling an interior of the mold member with the moldable and/or curable material.

11. The optical fiber fanout assembly of claim 10, wherein the mold member includes first and second mold members that form mold halves which together form an enclosed molding area for forming the body.

12. The optical fiber fanout assembly of claim 11, wherein each mold member includes a first groove for the first endcap and a second groove for the second endcap.

13. The optical fiber fanout assembly of claim 10, wherein portions of the optical fiber fanout assembly are translucent to allow observation of an interior of the optical fiber fanout assembly before and/or during application of the moldable and/or curable material.

14. An optical fiber fanout assembly comprising:
 a sleeve defining an interior volume for receiving a moldable and/or curable material, the sleeve having an inlet end and an outlet end;
 a first endcap positioned at the inlet end, the first endcap including a first rim;
 a second endcap positioned at the outlet end, the second endcap including a second rim;
 wherein a first cable extends to the inlet end of the sleeve;
 wherein a second cable has a first end which extends to the outlet end of the sleeve;
 optical fibers passing through between the first and second cables through the sleeve;
 vent holes located in the first and second rims for venting air from the sleeve; and
 a fill hole located in the second endcap for filling the interior volume of the sleeve with the moldable and/or curable material.

15. The optical fiber fanout assembly of claim 14, wherein a mold member holds the first and second endcaps to the sleeve.

16. The optical fiber fanout assembly of claim 14, wherein portions of the optical fiber fanout assembly are translucent to allow observation of an interior of the optical fiber fanout assembly before and/or during application of the moldable and/or curable material.

* * * * *